United States Patent
Adachi et al.

(10) Patent No.: US 11,825,522 B2
(45) Date of Patent: *Nov. 21, 2023

(54) WIRELESS COMMUNICATION DEVICE AND WIRELESS COMMUNICATION METHOD

(71) Applicant: KABUSHIKI KAISHA TOSHIBA, Tokyo (JP)

(72) Inventors: Tomoko Adachi, Kanagawa (JP); Ryoko Matsuo, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,975

(22) Filed: Feb. 9, 2022

(65) Prior Publication Data

US 2022/0174746 A1    Jun. 2, 2022

Related U.S. Application Data

(63) Continuation of application No. 16/519,915, filed on Jul. 23, 2019, now Pat. No. 11,277,867, which is a (Continued)

(30) Foreign Application Priority Data

Oct. 30, 2015   (JP) ................................. 2015-214898
Sep. 15, 2016   (JP) ................................. 2016-180872

(51) Int. Cl.
*H04W 74/08*   (2009.01)
*H04L 5/00*    (2006.01)
(Continued)

(52) U.S. Cl.
CPC ........... *H04W 74/0833* (2013.01); *H04L 1/00* (2013.01); *H04L 1/1825* (2013.01); (Continued)

(58) Field of Classification Search
CPC .............................. H04W 84/12; H04W 74/00
See application file for complete search history.

(56) References Cited

U.S. PATENT DOCUMENTS 8,290,503 B2   10/2012   Sadek et al.
8,363,578 B1    1/2013   Ramamurthy et al.
(Continued)

FOREIGN PATENT DOCUMENTS

CN    103828457 A    5/2014
EP    2 589 191 A1   5/2013
(Continued)

OTHER PUBLICATIONS

U.S. Appl. No. 62/112,894, filed Feb. 6, 2015, Chu et al.
(Continued)

*Primary Examiner* — Zhiren Qin
(74) *Attorney, Agent, or Firm* — Foley & Lardner LLP

(57) ABSTRACT

According to one embodiment, a wireless communication terminal includes: at least one antenna; a receiver; a transmitter; a communication processor; a network processor; and a memory. The transmitter is configured to transmit a first frame including information to specify a plurality of frequency components. The communication processor is configured to determine whether or not a second frame is received via each of the plurality of frequency components. The transmitter is configured to transmit a third frame including first information concerning a first value range which is used to determine whether to respond to the first frame, the first value range being dependent on a number of frequency components via which the second frame has been received. The first frame or the third frame includes the first data cached in the memory or information based on the first data.

4 Claims, 20 Drawing Sheets

Related U.S. Application Data continuation of application No. 15/267,885, filed on Sep. 16, 2016, now Pat. No. 10,420,148.

(51) Int. Cl.

| | | |
|---|---|---|
| *H04W 74/00* | (2009.01) | |
| *H04L 1/1825* | (2023.01) | |
| *H04L 1/00* | (2006.01) | |
| *H04L 69/28* | (2022.01) | |
| *H04W 28/02* | (2009.01) | |
| *H04L 1/1607* | (2023.01) | |
| *H04L 1/20* | (2006.01) | |
| *H04L 1/18* | (2023.01) | |
| *H04W 72/21* | (2023.01) | |
| *H04W 84/12* | (2009.01) | |
| *H04W 88/02* | (2009.01) | |
| *H04W 88/08* | (2009.01) | |

(52) U.S. Cl.
CPC .......... *H04L 5/0007* (2013.01); *H04L 5/0037* (2013.01); *H04L 5/0044* (2013.01); *H04L 5/0055* (2013.01); *H04L 69/28* (2013.01); *H04W 28/0268* (2013.01); *H04W 74/00* (2013.01); *H04L 1/1614* (2013.01); *H04L 1/18* (2013.01); *H04L 1/20* (2013.01); *H04L 5/0048* (2013.01); *H04L 2001/0093* (2013.01); *H04W 72/21* (2023.01); *H04W 84/12* (2013.01); *H04W 88/02* (2013.01); *H04W 88/08* (2013.01)

(56) References Cited

U.S. PATENT DOCUMENTS

| | | | |
|---|---|---|---|
| 8,811,426 B1 | 8/2014 | Banerjea | |
| 8,995,346 B2 | 3/2015 | Nabetani et al. | |
| 9,100,984 B2 | 8/2015 | Kim et al. | |
| 9,281,928 B2 | 3/2016 | Porat et al. | |
| 9,641,234 B2 | 5/2017 | Moon et al. | |
| 9,800,501 B2 | 10/2017 | Merlin | |
| 10,404,425 B2 | 9/2019 | Adachi et al. | |
| 10,728,802 B2 | 7/2020 | Adachi et al. | |
| 2006/0187942 A1 | 8/2006 | Mizutani et al. | |
| 2006/0203837 A1 | 9/2006 | Shvodian | |
| 2006/0245447 A1 | 11/2006 | Chou et al. | |
| 2008/0279210 A1 | 11/2008 | Naka et al. | |
| 2009/0323602 A1 | 12/2009 | Li et al. | |
| 2012/0009888 A1 | 1/2012 | Smadi | |
| 2012/0218983 A1 | 8/2012 | Noh et al. | |
| 2012/0275405 A1 | 11/2012 | Kim et al. | |
| 2013/0064119 A1 | 3/2013 | Montojo et al. | |
| 2013/0265907 A1 | 10/2013 | Kim et al. | |
| 2014/0045514 A1 | 2/2014 | Lee et al. | |
| 2014/0198642 A1* | 7/2014 | Barriac | H04W 74/08 370/230 |
| 2015/0063111 A1 | 3/2015 | Merlin et al. | |
| 2015/0063258 A1 | 3/2015 | Merlin et al. | |
| 2015/0146653 A1 | 5/2015 | Zhang et al. | |
| 2015/0146654 A1 | 5/2015 | Chu et al. | |
| 2015/0172012 A1 | 6/2015 | Abeysekera et al. | |
| 2015/0188675 A1 | 7/2015 | Abeysekera et al. | |
| 2015/0201434 A1 | 7/2015 | Fang et al. | |
| 2016/0007325 A1 | 1/2016 | Seok | |
| 2016/0014725 A1 | 1/2016 | Yu et al. | |
| 2016/0044533 A1 | 2/2016 | Seok | |
| 2016/0057736 A1 | 2/2016 | Jung et al. | |
| 2016/0105836 A1 | 4/2016 | Seok | |
| 2016/0128024 A1 | 5/2016 | Frederiks et al. | |
| 2016/0128102 A1 | 5/2016 | Jauh et al. | |
| 2016/0143006 A1 | 5/2016 | Ghosh et al. | |
| 2016/0165589 A1 | 6/2016 | Chu et al. | |
| 2016/0183305 A1 | 6/2016 | Huang et al. | |
| 2016/0227579 A1 | 8/2016 | Stacey et al. | |
| 2016/0242070 A1 | 8/2016 | Asterjadhi et al. | |
| 2016/0278081 A1 | 9/2016 | Chun | |
| 2016/0309508 A1 | 10/2016 | Li et al. | |
| 2016/0330722 A1 | 11/2016 | Pantelidou et al. | |
| 2016/0353434 A1 | 12/2016 | Ghosh et al. | |
| 2016/0353435 A1 | 12/2016 | Ghosh | |
| 2016/0360507 A1* | 12/2016 | Cariou | H04L 5/00 |
| 2017/0026151 A1 | 1/2017 | Adachi | |
| 2017/0048882 A1 | 2/2017 | Li et al. | |
| 2017/0079071 A1 | 3/2017 | Zhou et al. | |
| 2017/0127428 A1 | 5/2017 | Adachi et al. | |
| 2017/0127453 A1 | 5/2017 | Adachi | |
| 2017/0171723 A1 | 6/2017 | Adachi | |
| 2017/0180088 A1 | 6/2017 | Adachi et al. | |
| 2017/0181039 A1 | 6/2017 | Adachi et al. | |
| 2017/0188362 A1 | 6/2017 | Cariou et al. | |
| 2017/0196010 A1 | 7/2017 | Matsuo et al. | |
| 2017/0245306 A1 | 8/2017 | Kim et al. | |
| 2017/0289987 A1 | 10/2017 | Seok | |
| 2017/0366321 A1* | 12/2017 | Kim | H04L 1/1614 |
| 2018/0007561 A1 | 1/2018 | Adachi et al. | |
| 2018/0007701 A1 | 1/2018 | Adachi et al. | |
| 2018/0035488 A1* | 2/2018 | Yang | H04W 84/12 |
| 2018/0048573 A1 | 2/2018 | Merlin et al. | |
| 2018/0077735 A1 | 3/2018 | Ahn et al. | |
| 2018/0084605 A1* | 3/2018 | Li | H04W 74/0858 |
| 2018/0110076 A1 | 4/2018 | Ko et al. | |
| 2018/0124858 A1 | 5/2018 | Gan et al. | |
| 2018/0167882 A1 | 6/2018 | Choi et al. | |
| 2018/0184454 A1 | 6/2018 | Viger et al. | |
| 2018/0376507 A1 | 12/2018 | Kwon et al. | |
| 2019/0230629 A1 | 7/2019 | Chu et al. | |
| 2019/0268914 A1 | 8/2019 | Adachi | |
| 2019/0356435 A1 | 11/2019 | Adachi | |
| 2020/0314697 A1 | 10/2020 | Adachi | |
| 2022/0279528 A1 | 9/2022 | Ahn et al. | |
| 2023/0058825 A1 | 2/2023 | Li et al. | |

FOREIGN PATENT DOCUMENTS

| | | |
|---|---|---|
| EP | 3 294 036 A1 | 3/2018 |
| JP | 2005-223937 A | 8/2005 |
| JP | 2005-225937 A | 8/2005 |
| JP | 2006-135441 A | 5/2006 |
| JP | 2012-517147 A | 7/2012 |
| JP | 2013-131834 A | 7/2013 |
| JP | 2013-219687 A | 10/2013 |
| JP | 2015-515826 A | 5/2015 |
| JP | 2017-085508 A | 5/2017 |
| JP | 6656347 B2 | 3/2020 |
| JP | 6656348 B2 | 3/2020 |
| WO | WO-2006/000955 A1 | 1/2006 |
| WO | WO-2012/002855 A1 | 1/2012 |
| WO | WO-2014/014084 A1 | 1/2014 |
| WO | WO-2015/031431 A | 3/2015 |
| WO | WO-2015/068968 A | 5/2015 |
| WO | WO-2016/032007 A1 | 3/2016 |
| WO | WO-2016/126370 A1 | 8/2016 |
| WO | WO-2016/175328 A1 | 11/2016 |
| WO | WO-2016/175329 A1 | 11/2016 |

OTHER PUBLICATIONS

Adachi, Tomoko et al.: "Reception Status of Frames Transmitted in Random Access RUs", IEEE 802.11-15/1341r0, Toshiba, Nov. 2015, pp. 1-10.

Adachi, Tomoko et al.: "Reception Status of Frames Transmitted in Random Access RUs", IEEE 802.11-15/1341r1, Toshiba, Nov. 2015, pp. 1-10.

Ahn et al.: "Congestion Control for UL MU Random Access", IEEE 802.11-16/0085r0, Yonsei Univ., Jan. 2016, pp. 1-13.

Ahn et al.: "Congestion Control for UL MU Random Access", IEEE 802.11-16/0085r1, Yonsei Univ., Jan. 2016, pp. 1-15.

Ahn et al.: "Random Access Based Buffer Status Report", IEEE 802.11-15/1369r0, Yonsei Univ., Nov. 2015, pp. 1-10.

Ahn et al.: "Random Access Based Buffer Status Report", IEEE 802.11-15/1369r1, Yonsei Univ., Nov. 2015, pp. 1-10.

(56) References Cited

OTHER PUBLICATIONS

Ahn et al.: "UL OFDMA Random Access Control", IEEE 802.11-15/1370r0, Yonsei Univ., Nov. 2015, pp. 1-15.
Fang et al.: "UL MU Random Access Analysis", IEEE 802.11-15/0843r0, ZTE, Jul. 2015, pp. 1-20.
Fang et al.: "UL MU Random Access Analysis", IEEE 802.11-15/0843r1, ZTE, Jul. 2015, pp. 1-20.
Ghosh, Chittabrata et al.: "Power Save with Random Access", IEEE 802.11-15/1107r0, Intel, Sep. 2015, pp. 1-21.
Ghosh, Chittabrata et al.: "Random Access With Trigger Frames Using OFDMA", IEEE 802.11-15/0604-00, Intel, May 2015, pp. 1-16.
Ghosh, Chittabrata et al.: "Random Access With Trigger Frames Using OFDMA", IEEE 802.11-15/0604-01, Intel, May 2015, pp. 1-16.
Ghosh, Chittabrata et al.: "Random Access With Trigger Frames Using OFDMA", IEEE 802.11-15/0875r0, Intel, Jul. 2015, pp. 1-18.
Ghosh, Chittabrata et al.: "Random Access With Trigger Frames Using OFDMA", IEEE 802.11-15/0875r1, Intel, Jul. 2015, pp. 1-16.
Ghosh, Chittabrata et al.: "UL OFDMA-based Random Access Parameter Set (RAPS) Element", IEEE 802.11-16/1224r0, Intel, Sep. 2016, pp. 1-7.
Ghosh, Chittabrata et al.: "UL OFDMA-based Random Access Procedure", IEEE 802.11-15/1105r0, Intel, Sep. 2015, pp. 1-19.
Ghosh, Chittabrata: "Resolution for CIDs on UL OFDMA-based Random Access", IEEE 802.11-16/1222-00, Intel, Sep. 2016, pp. 1-14.
Ghosh, Chittabrata: "Resolution for CIDs on UL OFDMA-based Random Access", IEEE 802.11-16/1222-01, Intel, Sep. 2016, pp. 1-14.
Huang, Russell et al.: "Triggered OFDMA Random Access Observations", IEEE 802.11-15/1137-00, MediaTek, Sep. 2015, pp. 1-14.
Huang, Russell et al.: "Triggered OFDMA Random Access Observations", IEEE 802.11-15/1137-01, MediaTek, Sep. 2015, pp. 1-14.
IEEE Standards Association/IEEE Computer Society: "Part 11 : Wireless LAN Medium Access Control (MAC) and Physical Layer (PHY) Specifications", IEEE Std 802.11™, The Institute of Electrical and Electronics Engineers, Inc., Mar. 2012, pp. 1-2793.
IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11 ac™, The Institute of Electrical and Electronics Engineers, Inc., Dec. 2013, pp. 1-425.
Khorov et al.: "Considerations on Trigger Frame for Random Access Procedure", IEEE 802.11-16/0399r0, IITP RAS, Mar. 2016, pp. 1-11.
Khorov et al.: "Considerations on Trigger Frame for Random Access Procedure", IEEE 802.11-16/0399r1, IITP RAS, Mar. 2016, pp. 1-11.
Khorov et al.: "Random Access RU Allocation in the Trigger Frame", IEEE 802.11-16/0582r0, IITP RAS, May 2016, pp. 1-22.
Khorov et al.: "Random Access RU Allocation in the Trigger Frame", IEEE 802.11-16/0582r1, IITP RAS, May 2016, pp. 1-23.
Khorov et al.: "Random Access RU Allocation in the Trigger Frame", IEEE 802.11-16/0582r2, IITP RAS, May 2016, pp. 1-24.
Khorov et al.: "Random Access RU Allocation in the Trigger Frame", IEEE 802.11-16/0582r3, IITP RAS, May 2016, pp. 1-24.
Kim et al.: "Comment Resolution on OFDMA Random Access Procedure", IEEE 802.11-16/1158-00, LG Electronics, Jul. 2016, pp. 1-3.
Kim et al.: "Comment Resolution on OFDMA Random Access Procedure", IEEE 802.11-16/1158-01, LG Electronics, Jul. 2016, pp. 1-3.
Kim et al.: "Comment Resolution on OFDMA Random Access Procedure", IEEE 802.11-16/1158-02, LG Electronics, Jul. 2016, pp. 1-3.
Kim et al.: "Comment Resolution on OFDMA Random Access Procedure", IEEE 802.11-16/1158-03, LG Electronics, Jul. 2016, pp. 1-3.
Lanante et al.: "Adaptive Random Access UL OFDMA", IEEE 802.11-16/0661r0, Kyushu Inst. of Tech., May 2016, pp. 1-12.
Lanante et al.: "Adaptive Random Access UL OFDMA", IEEE 802.11-16/0661r1, Kyushu Inst. of Tech., May 2016, pp. 1-14.
Lanante et al.: "Random Access UL MU Resource Allocation and Indication", IEEE 802.11-16/0340r0, Kyushu Inst. of Tech., Mar. 2016, pp. 1-8.
Lanante et al.: "Random Access UL MU Resource Allocation and Indication", IEEE 802.11-16/0340r1, Kyushu Inst. of Tech., Mar. 2016, pp. 1-11.
Li et al.: "Comment Resolution on Retansmission of OFDMA Random Access", IEEE 802.11-16/1162-00, Huawei, Sep. 2016, pp. 1-6.
Li et al.: "Comment Resolution on Retansmission of OFDMA Random Access", IEEE 802.11-16/1162-01, Huawei, Sep. 2016, pp. 1-6.
Li et al.: "Comment Resolution on Retansmission of OFDMA Random Access", IEEE 802.11-16/1162-02, Huawei, Sep. 2016, pp. 1-6.
Li et al.: "Comment Resolution on Retansmission of OFDMA Random Access", IEEE 802.11-16/1162-03, Huawei, Sep. 2016, pp. 1-6.
Li et al.: "Comment Resolution on Retansmission of OFDMA Random Access", IEEE 802.11-16/1162-04, Huawei, Sep. 2016, pp. 1-6.
Stacey, Robert: "Specification Framework for TGax", IEEE 802.11-15/0132r09, Intel, Sep. 2015, pp. 1-22.
Stacey, Robert: "Specification Framework for TGax", IEEE 802.11-15/0132r17, Intel, Jan. 2016, pp. 1-61.
Adachi, Tomoko et al.: "Reception Status of Frames Transmitted in Random Access RUs", IEEE 802.11-15/1341-02-00 (1341r2), Toshiba, Nov. 2015, pp. 1-10.
Stéphane Baron et al.: "RU selection process upon TF-R reception; 11-15-1047-00-00ax-ru-selection-process-upon-tf-r-reception", Canon, IEEE Draft; 11-15-1047-00-00AX-RU-Selection-Process-Upon-TF-R-Reception, IEEE-SA Mentor, Piscataway, NJ USA, vol. 802.11ax, Sep. 14, 2015, pp. 1-9, XP068098236, {retrieved on Sep. 14, 2015}.
Stacey, Robert: "Specification Framework for TGax", IEEE 11-15-0132-09-00ax-spec-framework, Intel, Sep. 2015, pp. 1-22.
Stacey, Robert: "Specification Framework for TGax", IEEE 11-15-0132-17-00ax-spec-framework, Intel, May 2016, pp. 1-61.
Stacey, Robert: "Specification Framework for TGax", IEEE 11-15-0132-08-00ax-spec-framework, Intel, Sep. 2015, pp. 1-22.
Adachi et al.: U.S. Office Action on U.S. Appl. No. 15/267,863 dated Jan. 26, 2018.
IEEE Std 802.11n—2009, Oct. 29, 2009, pp. 56, 76-79, URL: https://ieeexplore.ieee.org/servlet/opac?punumber=5307291.
Translation of International Preliminary Report on Patentability dated Jun. 15, 2017 received in corresponding International Application No. PCT/JP2015/083660.
Stacey, Robert: "Specification Framework for TGax", IEEE 11-15-0132-02-00ax-spec-framework, Intel, Jan. 2015, pp. 1-3.
Stacey, Robert: "Specification Framework for TGax", IEEE 11-15-0132-05-00ax-spec-framework, Intel, May 2015, pp. 1-7.
Azizi et al.: "OFDMA Numerology and Structure", IEEE 802.11-15/0330r5, INTEL and LGE, May 2015, pp. 1-50.
Park, Minyoung: "Specification Framework for TGah", IEEE 802.11-11/1137r15, Intel, May 2013, pp. 1-77.
Rizzoli et al., "Computer-aided noise analysis of integrated microwave front-ends," IEEE MTT-S Digest, 1995, pp. 1561-1564.
Stacey, Robert: "Specification Framework for TGax", IEEE 11-15-0132-13-00ax-spec-framework, Intel, Nov. 2015, pp. 1-38.
Adachi et al., "Regarding trigger frame in UL MU", IEEE 802.11-15/0608r1, IEEE, Internet<URL:https://mentor.ieee.org/802.11/dcn/15/11-15-0608-01-00ax-regarding-trigger-frame-in-ul-mu.pptx>, Apr. 2015.
Girici et al., "Proportional Fair Scheduling Algorithm in OFDMA-Based Wireless Systems with QOS constraints", Journal of Communications and Networks, vol. 12, No. 1, Feb. 2010, pp. 30-42.
Ghosh, Chittabrata et al.: "Random Access With Trigger Frames Using OFDMA", IEEE 802.11-15/0604r0, Intel, May 2015, pp. 1-16.

(56) References Cited

OTHER PUBLICATIONS

Deng et al., "IEEE 802.11ax: Next Generation Wireless Local Area network", 2014 10th International Conference on Heterogeneous networking for Quality, reliability, Security and Robustness, 2014.
Notice of Allowance in U.S. Appl. No. 17/199,727 dated Mar. 1, 2023.
Notice of Allowance in U.S. Appl. No. 17/688,337 dated Mar. 17, 2023.
Notice of Allowance in U.S. Appl. No. 17/689,726 dated May 24, 2023.

* cited by examiner

| L-STF | L-LTF | L-SIG | SIG1 | SIG2 | Data |
|-------|-------|-------|------|------|------|
|       |       |       |      | SIG2 | Data |
|       |       |       |      | ... | |
|       |       |       |      | SIG2 | Data |

FIG. 13

WIRELESS COMMUNICATION DEVICE AND WIRELESS COMMUNICATION METHOD

CROSS-REFERENCE TO RELATED APPLICATIONS

This application is a continuation of U.S. patent application Ser. No. 16/519,915, filed Jul. 23, 2019, which is a continuation of U.S. patent application Ser. No. 15/267,885, filed Sep. 16, 2016, which is based upon and claims the benefit of priority from Japanese Patent Application No. 2015-214898, filed on Oct. 30, 2015 and Japanese Patent Application No. 2016-180872, filed on Sep. 15, 2016; the entire contents of all of which are incorporated herein by reference.

FIELD

Embodiments described herein relate to a wireless communication terminal and a wireless communication method.

BACKGROUND

Multi-user communication (multiplex communication) between a base station and a plurality wireless communication terminals (hereinafter, referred to as terminals) is discussed. Uplink multi-user communication is represented as UL-MU (UpLink Multi-User) communication, and downlink multi-user communication is represented as DL-MU (DownLink Multi-User) communication.

As the multi-user communication, frequency multiplexing communication is known according to which different frequency components for each wireless communication terminal (hereinafter referred to as terminal) are used as communication resources and transmissions to a plurality of terminals and receptions from a plurality of terminals are simultaneously performed. Here, Orthogonal Frequency Division Multiple Access (OFDMA) scheme is considered where the frequency components are defined as resource units each including one or a plurality of subcarriers, and the resource units each are used as a smallest unit of the communication resource, and transmissions to the plurality of terminals or receptions from the plurality of terminals are simultaneously performed. The simultaneous transmissions from the base station to the plurality of terminals correspond to downlink OFDMA (DL-OFDMA) transmission and the simultaneous transmissions from the plurality of terminals to the base station correspond to uplink OFDMA (UL-OFDMA) transmission. The DL-OFDMA is an example of the DL-MU, and The UL-OFDMA is an example of the UL-MU.

In a case of the UL-OFDMA, it may be considered that in order to match timings of uplink transmission, a trigger frame specifying terminals that are to be subjected to the UL-OFDMA and resource units allocated to the terminals is transmitted from a base station. This method has problems that in a case such as where the specified terminal is transited to a sleep mode, or the specified terminal has no uplink transmission request, the resource unit allocated to the specified terminal is not efficiently used and a usage efficiency of a communication resource is decreased.

There is another method in which the trigger frame does not specify any terminal, but specifies only resource units that are to be used. The method may include a case where a part of the resource units may be specified with respect to a terminal, but remaining resource units are specified with respect to no terminal. In any cases, the terminal to which no resource unit is allocated, of the terminals receiving the trigger frame, selects a resource unit randomly from the resource units specified with respect to no terminal (also referred to as "STA-unspecified RU") to use the selected resource unit. The trigger frame specifying the STA-unspecified RU may be called a trigger frame for random access.

Examples of the method selecting the resource unit randomly include the following method. Every time the trigger frame for random access is received, a random number (backoff count) selected from a contention window (CW) for random access is decremented by a value corresponding to the number of STA-unspecified RUs. If the decremented backoff count becomes below or 0, an access right with respect to the STA-unspecified RU is obtained, the resource unit is selected randomly from STA-unspecified RUs, and the frame is transmitted using the selected resource unit. Note that the CW for random access is different from a contention window used for deciding a backoff time to carrier sense in CSMA/CA.

In the above method, if plural terminals simultaneously obtain the access right, these terminals may select the same STA-unspecified RU to transmit their frames. In this case, the frames transmitted from these terminals collide at an access point, where the frames cannot successfully be decoded. Each of these terminals does not receive an acknowledgement response from the access point, and thus, determines that the frame transmitted by the terminal is not successfully received. In this case, these terminals select a random number from the CW for random access which is newly set by way of receiving the next trigger frame for random access and perform the same process, but at this time, how the CW is selected again is not clear. Selecting the CW for random access under the same condition as the terminal having succeeded in the transmission (e.g., terminal not selecting the same resource unit as other terminals) may lack fairness. In addition, as for also the terminal from which the frame is successfully received at the access point, how the CW is selected again is not clear. In this way, this method lacks a protocol for repeatedly using the trigger frame for random access.

Particularly, in a case where the trigger frame for random access is used to collect a UL-MU allocation request (uplink transmission request) from the terminals, the terminal having failed in the transmission from which the request is not received by the access point is not selected as a terminal to be subjected to the UL-MU. On the other hand, the terminal having successfully transmitted the UL-MU allocation request may be likely to be selected in accordance with the request as a terminal to be subjected to the UL-MU (given an opportunity to transmit by way of the UL-MU). Therefore, selecting the CW for random access under the same condition as the terminal having succeeded in the transmission may lack fairness.

BRIEF DESCRIPTION OF THE DRAWINGS

FIG. 13 is a diagram showing a schematic exemplary format of a physical packet used for DL-OFDMA transmission;

DETAILED DESCRIPTION

According to one embodiment, a wireless communication terminal includes: at least one antenna; a receiver coupled to the antenna and configured to receive a frame; a transmitter coupled to the antenna and configured to transmit a frame; a communication processor coupled to the receiver and the transmitter; a network processor coupled to the communication processor and configured to: transmit a data to the communication processor and receive a data from another apparatus; and a memory coupled to the network processor and configured to cache a first data.

The transmitter is configured to transmit a first frame including information to specify a plurality of frequency components. The communication processor is configured to determine whether or not a second frame is received via each of the plurality of frequency components. The transmitter is configured to transmit a third frame including first information concerning a first value range which is used to determine whether to respond to the first frame, the first value range being dependent on a number of frequency components via which the second frame has been received. The first frame or the third frame includes the first data cached in the memory or information based on the first data.

Hereinafter, embodiments of the present invention will be described with reference to the drawings. The entire contents of IEEE Std 802.11™-2012 and IEEE Std 802.11ac™-2013, known as the wireless LAN specification and IEEE 802.11-15/0132r9 dated Sep. 22, 2015 which is Specification Framework Document directed to IEEE Std 802.11ax as a next generation wireless LAN standards are herein incorporated by reference in the present specification.

First Embodiment

Figure 1:
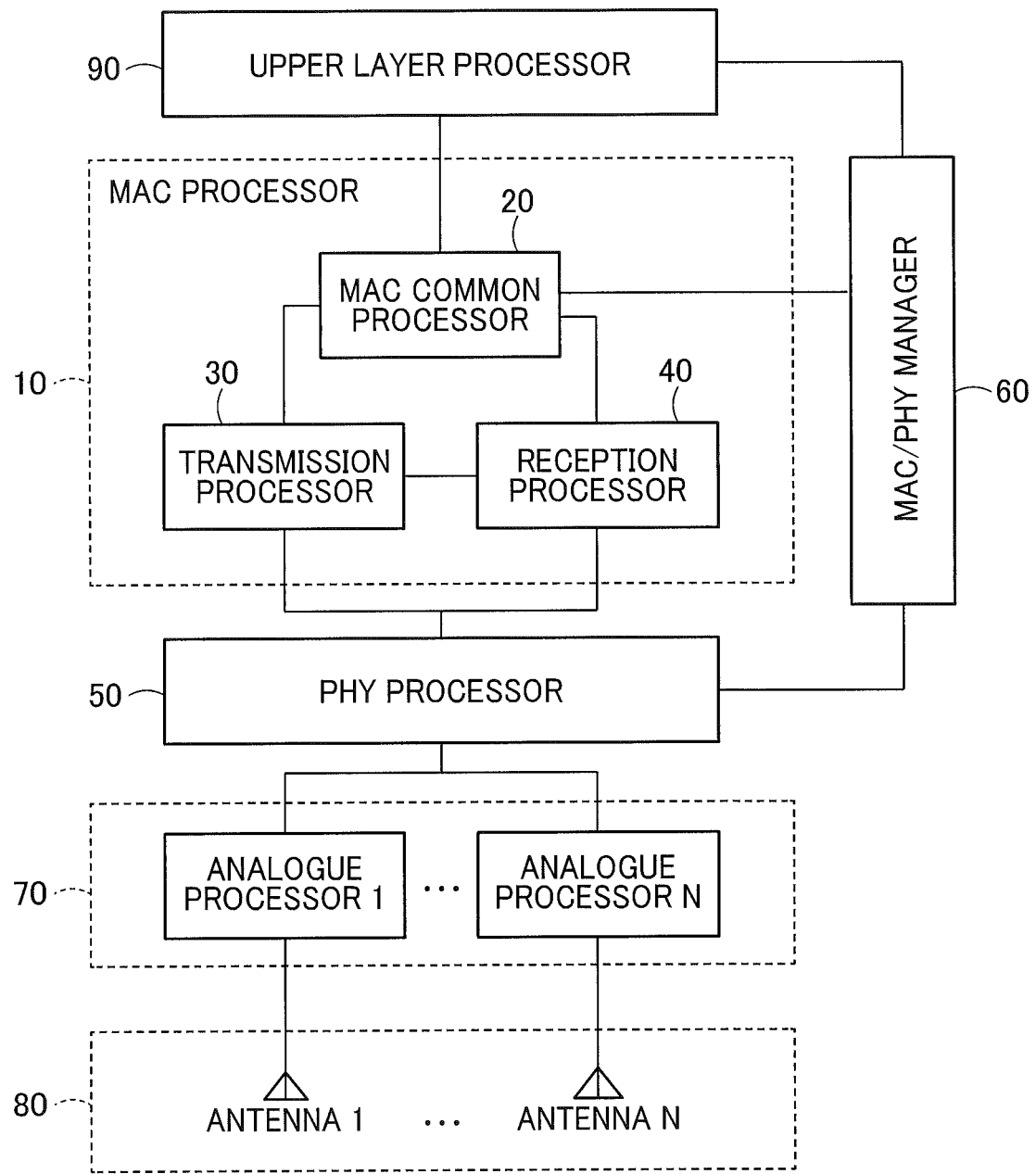
FIG. 1 is a functional block diagram of a wireless communication device according to an embodiment of the invention.

A functional block diagram of a wireless communication device (or a wireless device) according to the first embodiment of the present invention is illustrated in FIG. 1. This wireless communication device can be implemented in a wireless communication base station (hereinafter referred to as a base station or an access point) or in a wireless communication terminal (hereinafter referred to as a terminal) that communicates with the base station. The base station is one mode of the wireless communication terminal (or the terminal) in that the base station has the same or similar communication functions with those of the terminal with exception of the base station having a relay function. When a wireless communication terminal or a terminal is mentioned in the following explanations, it may refer to a base station as long as the terminal and the base station should be particularly discriminated from each other.

A wireless communication system according to an embodiment includes a base station and plurality of terminals mounting therein a wireless communication device shown in FIG. 1. In this system, OFDMA (Orthogonal Frequency Division Multiple Access) can be utilized for multi-user communication (multiplex communication). Uplink OFDMA is represented as UL-OFDMA. Downlink OFDMA is represented as DL-OFDMA. The system according to the embodiment can implement at least the UL-OFDMA. Hereinafter, a description is given of the OFDMA.

In UL-OFDMA, resource units each including one or a plurality of subcarriers are assigned to terminals (the resource unit may also be called subchannel, resource block, or frequency block), and receptions from the plurality of terminals are performed simultaneously on resource unit basis. The resource unit is a smallest unit of a resource for performing communication.

Figure 2:
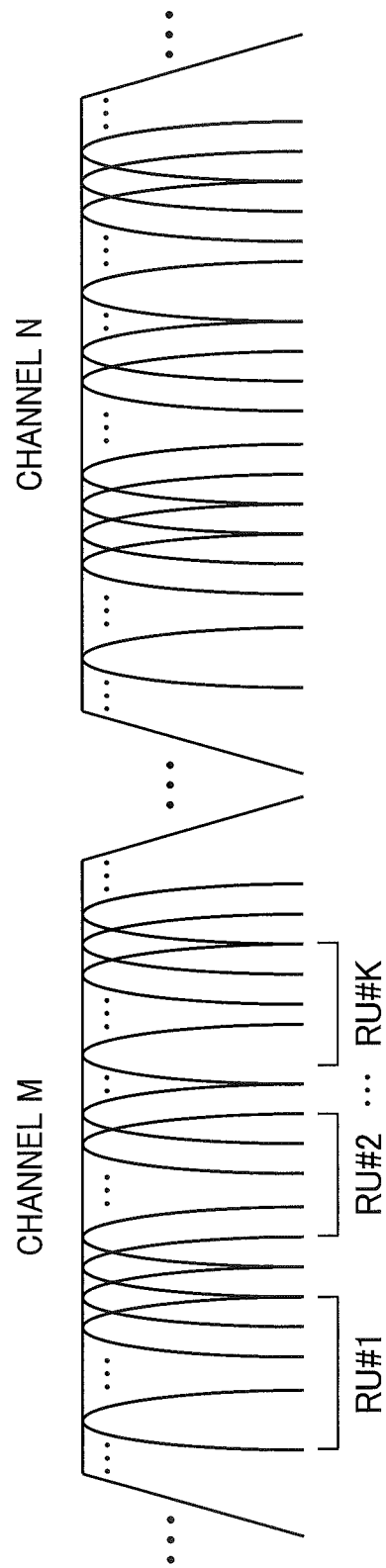
FIG. 2 is a diagram illustrating resource unit allocation.

FIG. 2 illustrates the resource units (RU #1, RU #2... RU #K) arranged within a continuous frequency domain of one channel (which is described here as the channel M). A plurality of subcarriers orthogonal to each other are arranged in the channel M, and a plurality of resource units including one or a plurality of continuous subcarriers are defined within the channel M. Although one or more subcarriers (guard subcarriers) may be arranged between the resource units, presence of the guard subcarrier is not essential. A number for identification of the subcarrier or the resource unit may be assigned to each carrier or each resource unit in the channel. The bandwidth of one channel may be for example, though not limited to these, 20 MHz, 40 MHz, 80 MHz, and 160 MHz. One channel may be constituted by combining a plurality of channels of 20 MHz. The number of subcarriers in the channel or the number of resource units may vary in accordance with the bandwidth. Uplink OFDMA communication is realized by different resource units being simultaneously used by different terminals.

Figure 3:
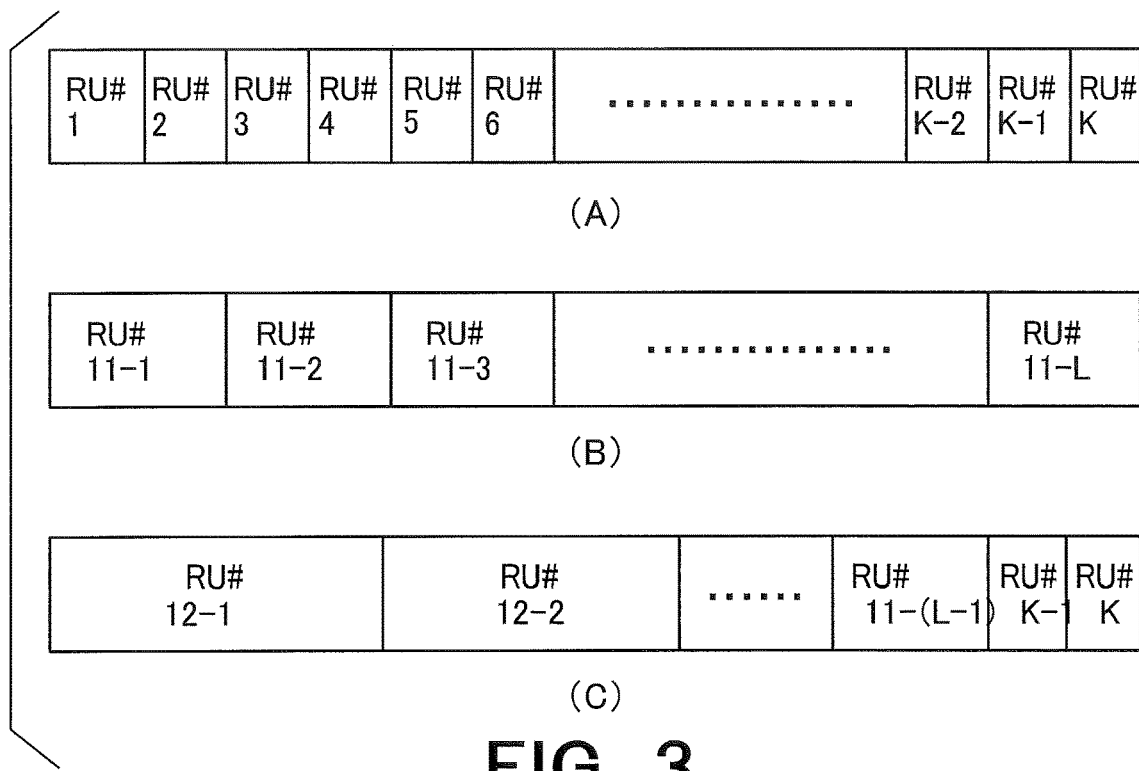
FIG. 3 is a diagram illustrating a form of a resource unit.

The bandwidths of the resource units (or the number of the subcarriers) may be same among the resource units, or the bandwidths (or the number of the subcarriers) may vary depending on the individual resource units. An exemplary arrangement pattern of the resource units within one channel is schematically illustrated in FIG. 3. The width direction on the paper surface corresponds to the frequency domain direction. FIG. 3(A) illustrates an example where a plurality of resource units (RU #1, RU #2. . . RU #K) having the same bandwidth are arranged, and FIG. 3(B) illustrates another example where a plurality of resource units (RU #11-1, RU #11-2. . . RU #11-L) having a larger bandwidth than that of FIG. 3(A) are arranged. FIG. 3(C) illustrates a still another example where resource units with three types of bandwidths are arranged. The resource units (RU #12-1, RU #12-2) have the largest bandwidth, the resource unit RU #11-(L–1) has the bandwidth identical to that of FIG. 3(B), and the resource units (RU #K–1, RU #K) have the bandwidth identical to that of FIG. 3(A).

A specific example is illustrated. When the entire 20 MHz channel width is used, 26 resource units (tones) may be specified for the 256 subcarriers (tones) arranged within the 20 MHz channel width. In other words, nine resource units are specified in the 20 MHz channel width and the bandwidth of the resource unit becomes smaller than the 2.5 MHz width. In the case of a 40 MHz channel width, 18 resource units are specified therefor. In the case of an 80 MHz channel width, 37 resource units are specified. When this is extended, for example, in the case of a 160 MHz channel width or an 80+80 MHz channel width, 74 resource units are specified. It will be appreciated that the width of the resource unit is not limited to a particular value and resource units of various sizes can be arranged.

Here, the number of resource units used by each terminal is not limited to a particular value and one or a plurality of resource units may be used. When a terminal uses a plurality of resource units, a plurality of resource units that are continuous in terms of frequency may be used, or a plurality of resource units that are located at positions away from each other may be allowed to be used. The resource unit #11-1 may be regarded as one example of a resource unit bonding the resource units #1 and #2.

It is assumed here that subcarriers within one resource unit are continuous in the frequency domain. However, resource units may be defined with use of a plurality of subcarriers that are arranged in a non-continuous manner. The channels used in uplink OFDMA communication are not limited to one single channel but resource units may be reserved in another channel (see the channel N in FIG. 2, for example) arranged at a location away in the frequency domain from the channel M as the case of the channel M and thus the resource units in both the channel M and the channel N may be used. The same or different modes of arranging the resource units may be used for the channel M and the channel N. The bandwidth of the channel N is by way of example 20 MHz, 40 MHz, 80 MHz, 160 MHz, etc. as described above but not limited to them. It is also possible to use three or more channels. It is considered here that the combining of the channel M and the channel N may be regarded as one single channel.

It is assumed here that a terminal that implements OFDMA is successful in carrying out reception and decoding (including demodulation, decoding of error correcting code, etc.) of a physical packet including a frame on a channel of at least the basic channel width (20 MHz channel width if an IEEE 802.11a/b/g/n/ac standard-compliant terminal is regarded as a legacy terminal) at the legacy terminal that is to be backward compatible. With regard to the carrier sense, it is carried out in a unit of the basic channel width.

The carrier sense may encompass both physical carrier sense associated with busy/idle of CCA (Clear Channel Assessment) and Virtual Carrier Sense based on medium reservation time indicated in the received frame. As in the case of the latter, a scheme for virtually determining that a medium is in the busy state, or the term during which the medium is virtually regarded as being in the busy state is called Network Allocation Vector (NAV). Here, carrier sense information based on CCA or NAV carried out in a unit of a channel may be universally applied to all the resource units within the channel. For example, resource units belonging to the channel indicated as being in the idle state by the carrier sense information are all in the idle state.

With regard to OFDMA, channel-based OFDMA is also applicable in addition to the above-described resource-unit-based OFDMA. OFDMA of this case may in particular be called MU-MC (Multi-User Multi-Channel). In MU-MC, a base station assigns a plurality of channels (one channel width is, for example, 20 MHz, etc.) to a plurality of terminals, and the plurality of channels are simultaneously used to carry out simultaneous transmissions to the plurality of terminals or simultaneous receptions from the plurality of terminals. The OFDMA which will be described below means the resource-unit-based OFDMA: however, an embodiment of channel-based OFDMA can also be implemented with appropriate replacement of terms and phrases in the following explanations such as reading the "resource unit" as the "channel".

In the following description, a terminal having the capability of implementing the OFDMA is referred to as an OFDMA-compliant terminal or the like in some cases. A terminal not having the capability is referred to as a legacy terminal in some cases. In a case where the capability of implementing an OFDMA communication can be switched to be enabled or disabled, a terminal of which the capability is enabled may be considered as the OFDMA-compliant terminal.

As illustrated in FIG. 1, a wireless communication device incorporated in a terminal (which may be either a terminal of non-base station or the base station) includes a upper layer processor 90, a MAC processor 10, a physical (PHY) processor 50, a MAC/PHY manager 60, an analog processor 70 (analog processors 1 to N), and an antenna 80 (antennas 1 to N), where N represents an integer equal to or larger than 1. In the figure, the N analog processors and the N antennas are connected in pairs with each other, but the configuration is not limited to the illustrated one. For example, one analog processor and two or more antennas may be connected to this analog processor in a shared manner.

The MAC processor 10, the MAC/PHY manager 60, and the PHY processor 50 correspond to a mode of controller, controlling circuitry or baseband integrated circuit that carries out processing associated with communications with other terminals (including the base station). The analog processor 70 corresponds, for example, to a wireless communication unit or a radio frequency (RF) integrated circuit that transmits and receives signals via the antenna 80. The integrated circuit for wireless communication in accordance with this embodiment includes at least the former of the baseband integrated circuit and the RF integrated circuit. The functions of the communication processing device or the baseband integrated circuit may be performed by software (programs) that runs on a processor such as a CPU or may be performed by hardware, or may be performed by both of the software and the hardware. The software may be stored in a storage medium such as a memory device including a ROM, a RAM, etc., a hard disk, or an SSD and read therefrom to be executed. The memory device may be a volatile memory device such as an SRAM or a DRAM, or a non-volatile memory device such as a NAND or an MRAM.

The upper layer processor 90 is configured to carry out processing for the Medium Access Control (MAC) layer associated with the upper layer or layers. The upper layer processor 90 is successful in exchanging signals with the MAC processor 10. As the upper layer, TCP/IP, UDP/IP, and the application layer upper than these two protocols may be mentioned as typical examples but this embodiment is not limited to them. The upper layer processor 90 may include a buffer for exchanging data between the MAC layer and the upper layer or layers. It may also be considered that it may be connectable to a wired infrastructure via the upper layer processor 90. The buffer may be a memory device, an SSD drive, or a hard disk. When the buffer is a memory device, the memory device may be a volatile memory device such as an SRAM or a DRAM, or a non-volatile memory device such as a NAND or an MRAM.

The MAC processor 10 is configured to carry out processing for the MAC layer. As described above, the MAC processor 10 is successful in exchanging signals with the upper layer processor 90. Further, the MAC processor 10 is successful in exchanging signals with the PHY processor 50. The MAC processor 10 includes a MAC common processor 20, a transmission processor 30, and a reception processor 40.

The MAC common processor 20 is configured to carry out common processing for transmission and reception in the MAC layer. The MAC common processor 20 is connected to and exchanges signals with the upper layer processor 90, the transmission processor 30, the reception processor 40, and the MAC/PHY manager 60.

The transmission processor 30 and the reception processor 40 are connected to each other. Also, the transmission processor 30 and the reception processor 40 are each connected to the MAC common processor 20 and the PHY processor 50. The transmission processor 30 is configured to carry out transmission processing in the MAC layer. The reception processor 40 is configured to carry out reception processing in the MAC layer.

The PHY processor 50 is configured to carry out processing for a physical layer (PHY layer). As described above, the PHY processor 50 is successful in exchanging signals with the MAC processor 10. The PHY processor 50 is connected via an analog processor 70 to an antenna 80.

The MAC/PHY manager 60 is connected to the upper layer processor 90, the MAC processor 10 (more specifically, the MAC common processor 20), and the PHY processor 50. The MAC/PHY manager 60 is configured to manage MAC operation and PHY operation in the wireless communication device.

The analog processor 70 includes an analog-to-digital and digital-to-analog (AD/DA) converter and a radio frequency (RF) circuit. The analog processor 70 is configured to convert a digital signal from the PHY processor 50 into an analog signal having a desired frequency and transmit it from the antenna 80, or convert a high-frequency analog signal received from the antenna 80 into a digital signal. It is considered here that although AD/DA conversion is carried out by the analog processor 70, another configuration is also possible according to which the PHY processor 50 has the AD/DA conversion function.

The wireless communication device in accordance with this embodiment has its constituent element (i.e., incorporates) the antenna 80 in one single chip and thereby makes it possible to reduce the mounting area of the antenna 80. Further, in the wireless communication device in accordance with this embodiment, as illustrated in FIG. 1, the transmission processor 30 and the reception processor 40 shares the N antennas 80. By virtue of sharing the N antennas 80 by the transmission processor 30 and the reception processor 40, it is made possible to reduce the size of the wireless communication device of FIG. 1. It is considered here that the wireless communication device in accordance with this embodiment may have a configuration different than the one depicted by way of example in FIG. 1.

In reception of a signal from a wireless medium, the analog processor 70 converts an analog signal received by the antenna 80 into a baseband signal that can be processed by the PHY processor 50, and further converts the baseband signal into a digital signal. The PHY processor 50 is configured to receive a digital signal that is received from the analog processor 70 and detect its reception level. The detected reception level is compared with the carrier sense level (threshold). When the reception level is equal to or larger than the carrier sense level, the PHY processor 50 outputs a signal indicative of the fact that the medium (CCA: Clear Channel Assessment) is in the busy state to the MAC processor 10 (the reception processor 40 to be more precise). When the reception level is less than the carrier sense level, the PHY processor 50 outputs a signal indicative of the fact that the medium (CCA) is in the idle state to the MAC processor 10 (the reception processor 40 to be more precise).

The PHY processor 50 is configured to carry out decoding processing for the received signal (including demodulation and decoding of error correcting code, etc.), processing of removing a physical header (PHY header) including a preamble, or the like, and extracts a payload. According to IEEE 802.11 standard, this payload is called physical layer convergence procedure (PLCP) service data unit (PSDU) on the PHY side. The PHY processor 50 delivers the extracted payload to the reception processor 40, and the reception processor 40 handles it as a MAC frame. According to IEEE 802.11 standard, this MAC frame is called medium access control (MAC) protocol data unit (MPDU). In addition, the PHY processor 50, when it started to receive the reception signal, notifies the fact of having started reception of the reception frame to the reception processor 40, and, when it completed the reception of the reception signal, notifies the fact of having completed the reception to the reception processor 40. Also, the PHY processor 50, when the reception signal has been decoded successfully as the physical packet (PHY packet) (when it does not detect an error), notifies the completion of the reception of the reception signal and delivers a signal indicative of the fact that the medium is in the idle state to the reception processor 40. The PHY processor 50, when it detected an error in the reception signal, notifies the fact that the error has been detected with an appropriate error code in accordance with the error type to the reception processor 40. Also, the PHY processor 50, at the timing at which the medium has been determined to enter the idle state, notifies a signal indicative of the fact that the medium is in the idle state to the reception processor 40.

The MAC common processor 20 performs intermediary processing for delivery of transmission data from the upper layer processor 90 to the transmission processor 30 and for delivery of reception data from the reception processor 40 to the upper layer processor 90. According to IEEE 802.11 standard, the data in this MAC data frame is called medium access control (MAC) service data unit (MSDU). Also, the MAC common processor 20 receives instructions from the MAC/PHY manager 60 and then converts the instruction into appropriate form of instructions for the transmission processor 30 and the reception processor 40 and outputs the converted instructions to these units.

The MAC/PHY manager 60 corresponds, for example, to station management entity (SME) in IEEE 802.11 standard. In that case, the interface between the MAC/PHY manager 60 and the MAC common processor 20 corresponds to MAC subLayer management entity service access point (MLME SAP) in IEEE 802.11 standard, and the interface between the MAC/PHY manager 60 and the PHY processor 50 corresponds to physical layer management entity service access point (PLME SAP) in IEEE 802.11 wireless local area network (LAN).

It is considered here that although the MAC/PHY manager 60 in FIG. 1 is illustrated on the assumption that the functional unit for the MAC management and the functional unit for the PHY management are configured to be integral with each other, these units may be separately implemented.

The MAC/PHY manager 60 stores Management Information Base (MIB). The MIB stores various pieces of information such as the capability of the device itself and whether various functions are enabled or disabled. For example, information may be stored regarding whether or not the device itself supports OFDMA and, if the device itself supports OFDMA, whether or not the function to implement OFDMA is enabled or disabled. A memory device for storing and managing the MIB may be incorporated in the MAC/PHY manager 60 or separately provided without being incorporated into the MAC/PHY manager 60. When the memory device for storing and managing the MIB is provided separately from the MAC/PHY manager 60, the MAC/PHY manager 60 can refer to the separately provided memory device and rewrite rewritable parameters within the memory device. The memory device may be a volatile memory device such as an SRAM or a DRAM, or a non-volatile memory device such as a NAND or an MRAM. Also, storage devices such as a hard disk and an SSD may be used in place of the memory device. In the base station, these pieces of information of the other terminals that are not a base station can also be obtained by notification from these terminals. In that case, the MAC/PHY manager 60 is adapted to be successful in referring to and rewriting the information regarding the other terminals. Alternatively, the memory device for storing the information on the other terminals may be held and managed separately from the MIB. In that case, either the MAC/PHY manager 60 or the MAC common processor 20 is adapted to be successful in referring to and rewriting the separate memory device. Also, the MAC/PHY manager 60 of the base station may include a selection function for, when implementing OFDMA, selecting the terminals to which the resource units for OFDMA are assigned on the basis of various pieces of information regarding terminals that are not a base station, or on the basis of the requests from the terminals (i.e., selecting the terminals subject to OFDMA of this time).

Also, the MAC/PHY manager 60 or the MAC processor 10 may manage the data (transmission) rate applied to the MAC frame and the physical header aimed at transmission. Also, the MAC/PHY manager 60 of the base station may define and manage a supported rate set which is a rate set supported by the base station. The supported rate set may include a rate that should compulsorily supported by the terminal that is connected to the base station and an optional rate.

The MAC processor 10 is configured to handle three types of MAC frames, i.e., a data frame, a control frame, and a management frame, and carry out various processing procedures defined in the MAC layer. Here, the three types of MAC frames are described.

The management frame is for use in management of communication link with another terminal. As the management frame, for example, Beacon frame may be mentioned. The Beacon frame notifies attribute and synchronization information of a group to form a wireless communication group which is a Basic Service Set (BSS) in IEEE 802.11 standard. Also, a frame for authentication or establishing the communication link may also be mentioned. It is considered here that a state where a certain terminal completed exchange of information necessary for establishing a wireless communication with another terminal is expressed here as (the state where) the communication link is established. As the exchange of necessary information, for example, notification of the functions that the device itself supports (for example, support of the OFDMA scheme and various capabilities which will be later described, etc.), and negotiation regarding settings of the scheme may be mentioned. The management frame is generated on the basis of the instruction received by the transmission processor 30 from the MAC/PHY manager 60 via the MAC common processor 20.

With regard to the management frame, the transmission processor 30 achieves notifying various pieces of information to other terminals by the management frame. A terminal that is not a base station may notify the type of the terminal itself to the base station by putting in the management frame information regarding such as whether it is an OFDMA-compliant terminal, an IEEE 802.11n-compliant terminal, or an IEEE 802.11ac-compliant terminal. As for this management frame, for example, Association Request frame used in the association process which is one of the procedures for authentication between the terminal and the base station or Reassociation Request frame used in the reassociation process may be mentioned. The base station may notify the information on whether or not it supports UL-OFDMA communication to the terminal that is not the base station by the management frame. As the management frame used for this, for example, Beacon frame and Probe Response frame may be mentioned. The Probe Response frame is a response to the Probe Request frame transmitted by the terminal that is not the base station. The base station may have a function of grouping terminals which are connected to itself. The above-described notification means at the base station may notify to each of the terminals a group ID by the management frame. The group ID is a group identifier of the group to which the terminal itself belongs. As this management frame, for example, Group ID Management frame may be mentioned. The group ID may be, for example, an identifier that expands the concept of a group ID (six bits) defined for DL-MU-MIMO in IEEE Std 802.11ac-2013 such that it covers a case of OFDMA, or may be a group ID that is defined in accordance with a method different from this.

Here, association ID (AID) is described. The AID is an identifier of a terminal (terminal identifier) assigned by the base station to this terminal in the association process for allowing the terminal to make a connection to the base station and enabling data frame exchange in the BSS under the base station. The association process, specifically, is a process that becomes successful when an Association Request frame is transmitted from the terminal to the base station and an Association Response frame is transmitted from the base station to the terminal and the terminal Status Code field in the Association Response frame is 0 which represents success. The communication capability of the transmission terminal is included in both Association Request frame and Association Response frame, by virtue of which both parties that received either of them grasp the communication capabilities of their counterparts. When terminal Status Code field in the Association Response frame is 0 representing success, the AID is extracted from the AID field (16 bits) in the same frame and it is used as the AID of the transmission destination terminal. In other words, the AID is assigned from the base station to the terminal at this point, and the terminal enters a state where the AID is enabled. In a state where this base station is connected to (have Association with) the terminal, the AID of the terminal is enabled. Meanwhile, when a Disassociation frame is transmitted from the base station to this terminal and this terminal receives it, or when the Disassociation frame is transmitted from this terminal to the base station, the AID of this terminal is disabled (null). It will be appreciated that the AID is null on a terminal that has not had the association process with any base station. It can also be said that the state where the AID is null is a state where the AID is not assigned.

The reception processor 40 has a receiver that receives various types of information via the management frame from other terminals. As one example, the receiver of the base station may receive information associated with compatibility with OFDMA communication from any terminal as a non-base station. Also, it may receive information associated with an adaptable channel width (the maximum available channel width) if this terminal is a legacy terminal (IEEE 802.11a/b/g/n/ac standard-compliant terminal and the like). The receiver of the terminal may receive from the base station information associated with compatibility as to whether or not OFDMA is supported.

The examples of the information to be transmitted and received via the management frame as described above are merely examples and various other types of information can be transmitted and received via the management frame between terminals (including the base station). For example, an OFDMA-compliant terminal may select either or both of a resource unit and a channel that the terminal itself wants to use in the OFDMA transmission from either or both of non-interference channels and non-interference resources based on carrier sense. And information regarding the resource unit, channel, or both of them that have been selected may be notified to the base station. In this case, the base station, on the basis of this information, may perform assignment of the resource units for the OFDMA communication for each of the OFDMA-compliant terminals. It is considered here that the channels used in the OFDMA communication may be all of the channels that are available as the wireless communication system or may be a subset (one or a plurality) of the channels.

The data frame is for use in transmission of data to another terminal in a state where the communication link is established with the other terminal. For example, data is generated in the terminal by an operation of an application by a user, and the data is carried by the data frame.

Specifically, the generated data is delivered from the upper layer processor 90, via the MAC common processor 20, and to the transmission processor 30, the data is put into the frame body field by the transmission processor 30, and a MAC header is added to the this frame body field, and thus the data frame is generated. In addition, a physical header is added to the data frame by the PHY processor 50, the physical packet is generated, and the physical packet is transmitted via the analog processor 70 and the antenna 80. Also, when the physical packet is received by the PHY processor 50, the PHY processor 50 performs the processing for the physical layer on the basis of the physical header, and extracts the MAC frame (here, the data frame), and delivers the data frame to the reception processor 40.

When the reception processor 40 receives the data frame (recognizes that the received MAC frame is a data frame), the reception processor 40 extracts the information in the frame body field as data, and delivers the extracted data via the MAC common processor 20 to the upper layer processor 90. As a result, operations occur on applications such as writing, reproduction, and the like of the data.

The control frame is for use in control in transmission and reception (exchange) of the management frame and the data frame to/from (with) the other wireless communication device. As the control frame, for example, RTS (Request to Send) frame, CTS (Clear to Send) frame may be mentioned which are exchanged with the other wireless communication device to make a reservation of the wireless medium prior to starting exchange of the management frame and the data frame. Also, as another control frame, delivery confirmation response frame for confirmation of delivery of the received management frame and the data frame may be mentioned. As examples of the delivery confirmation response frame, ACK frame and BA (BlockACK) frame may be mentioned. Since the CTS frame is transmitted as a response to the RTS frame, it can be said that the CTS is a frame that represents a delivery confirmation response. CF-End frame is also one of the control frames. The CF-End frame is a frame that announces the completion of the CFP (Contention Free Period) or the truncation of the TXOP after-mentioned, in other words, a frame permitting other wireless communication devices to access the wireless medium. These control frames are generated by the transmission processor 30. With regard to the control frames (CTS frame, ACK frame, BA frame, etc.) transmitted as a response to the received MAC frame, the reception processor 40 determines whether or not transmission of a response frame (control frame) is necessary, and outputs information necessary for frame generation (type of the control frame, information specified in the RA (Receiver Address) field, and the like) to the transmission processor 30 along with the transmission instruction. The transmission processor 30 generates an appropriate control frame on the basis of the information necessary for generation of the frame and the transmission instruction.

When a MAC frame is transmitted on the basis of CSMA/CA (Carrier Sense Multiple Access with Carrier Avoidance), the MAC processor 10 needs to acquire the access right (transmission right) on the wireless medium. The transmission processor 30, on the basis of carrier sense information from the reception processor 40, measures the transmission timing. The transmission processor 30, in accordance with the transmission timing, gives the transmission instruction to the PHY processor 50, and further delivers the MAC frame thereto. In addition to the transmission instruction, the transmission processor 30 may instruct a modulation method and a coding method to be used in the transmission. In addition to them, the transmission processor 30 may provide an instruction regarding the transmission power. When the MAC processor 10, after having acquired the access right (transmission right), obtained the period of time during which the medium can be occupied (Transmission Opportunity; TXOP), then the MAC processor 10 is allowed to continuously exchange the MAC frames with other wireless communication devices although there is some limitation such as the QoS (Quality of Service) attribute. The TXOP is acquired, for example, when the wireless communication device transmits a predetermined frame (for example, an RTS frame) on the basis of CSMA/CA (Carrier Sense Multiple Access with Carrier Avoidance) and correctively receives a response frame (for example, a CTS frame) from another wireless communication device. When this predetermined frame is received by the other wireless communication device, the other wireless communication device transmits the above response frame after the elapse of the minimum frame interval (Short InterFrame Space; SIFS). Also, as a method of acquiring the TXOP without using the RTS frame, for example, cases may be mentioned where data frame that requests transmission of the delivery confirmation response frame is transmitted directly by the unicast (as will be described later, this frame may be a frame in the form of conjunct frames or conjunct payloads) or a management frame that requests transmission of the delivery confirmation response frame is transmitted, and delivery confirmation response frame (ACK frame, BlockACK frame or the like) in response thereto is correctly received. Alternatively, when a frame is transmitted that does not request, for the other wireless communication device, transmission of the delivery confirmation response frame with a period equal to or longer than the time period needed to transmit this frame specified in the Duration/ID field of this frame, then it may be interpreted that with the transmission of this frame, TXOP of the period described in the Duration/ID field has been acquired.

The reception processor 40 is configured to manage the above-described carrier sense information. This carrier sense information includes both Physical Carrier Sense information regarding busy/idle states of the medium (CCA) input from the PHY processor 50 and Virtual Carrier Sense information on the basis of the medium reservation time described in the received frame. If either one of these carrier sense information pieces indicates the busy state, then the medium is regarded as being in the busy state in which transmission is prohibited. It is considered here that in IEEE 802.11 standard, the medium reservation time is described in the Duration/ID field in the MAC header. The MAC processor 10, when having received a MAC frame that is addressed to other wireless communication devices (that is not addressed to the device itself), determines that the medium is virtually in the busy state from the end of the physical packet including this MAC frame over the medium reservation time. A scheme of this type for virtually determining that a medium is in the busy state, or the term during which the medium is virtually regarded as being in the busy state is called Network Allocation Vector (NAV). It can be said that the medium reservation time represents the length of time period during which suppression of accesses to the wireless medium is instructed, i.e., the length of time period during which accesses to the wireless medium are deferred.

Here, the data frame may be a frame such that a plurality of MAC frames (i.e., MPDUs or sub-frames) are conjunct with each other or payload portions of a plurality of MAC frames are conjunct with each other. The former data frame is called A (Aggregated)-MPDU and the latter data frame is called A (Aggregated)-MSDU (MAC service data unit) in IEEE 802.11 standard. In the case of the A-MPDU, a plurality of MPDUs are conjunct with each other within the PSDU. Also, as a MAC frame, in addition to the data frame, the management frame and the control frame are also eligible for this conjunction. In the case of the A-MSDU, MPDUs which are a plurality of data payloads are conjunct with each other within the frame body of one MPDU. In both cases of the A-MPDU and the A-MSDU, partition information (length information, etc.) is stored in the frame such that the conjunction of the MPDUs and combination of MPDUs can be appropriately separated by the terminal on the reception side. Both of the A-MPDU and the A-MSDU may be used in combination. Also, the A-MPDU may involve not a plurality of MAC frames (MPDUs or sub-frames) but one single MAC frame, and also in this case the partition information is stored in the frame. Also, when an A-MPDU or the like is received, responses to the plurality of MAC frames (i.e., MPDUs or sub-frames) being conjunct are transmitted together. The BA (BlockACK) frame is used as the response in this case in place of the ACK frame. In the following explanations and figures, the notation of MPDU may be used, but it is assumed here that this notation includes the cases of the above-described A-MPDU and the A-MSDU.

According to IEEE 802.11 standard, several procedures are defined in multiple stages to be taken for a terminal that is not the base station to participate in a BSS (which is called Infrastructure BSS) configured with the base station amongst others and to perform exchange of data frames within the BSS. For example, there is provided a procedure called association, according to which an Association Request frame is transmitted from the terminal that is not the base station to the base station to which the terminal requests the connection. The base station, after having transmitted an ACK frame for the association request frame, transmits an Association Response frame which is a response to the association request frame.

The terminal stores the capability of the terminal itself in the association request frame and transmits this association request frame, and thus can make notification of the capability of the terminal itself to the base station. For example, the terminal may add, to the association request frame, the channel, the resource unit, or both of them that the terminal itself can support, and information for identifying the standard supported by the terminal itself into the association request frame and transmit this association request frame. This information may be also set in the frame transmitted by the procedure called reassociation (reassociation) to reconnect to another base station. In this procedure of reassociation, a Reassociation Request frame is transmitted to the other base station to which reconnection is requested from the terminal. The other base station, after having transmitted the ACK frame in response to the reassociation request frame, transmits a reassociation response which is a response to the reassociation request frame.

As the management frame, in addition to the association request frame and the reassociation request frame, a beacon frame, a probe response frame, etc. may be used. The beacon frame is basically transmitted by the base station, and is successful in storing parameter notifying the capability of the base station itself along with the parameters indicating the attributes of the BSS. In view of this, as the parameter notifying the capability of the base station itself, the base station may be adapted to add the information on whether or not OFDMA is supported. Also, as the other parameter, information on the supported rates of base station may be notified. The supported rates may include mandatory rates required to be supported by the terminals participating in the BSS formed by the base station and an optional rate. The probe response frame is a frame transmitted from the terminal that transmits the beacon frame in response to a probe request frame received. The probe response frame is basically the one that notifies the same content as that of the beacon frame, and the base station, when it uses the probe response frame, is also successful in notifying the capability of the station itself to the terminal that transmitted the probe request frame. By making this notification to the OFDMA-compliant terminal, an operation may be performed according to which the terminal, for example, enables the function of the OFDMA communication of the terminal itself.

It is considered here that the terminal may notify the information regarding the rates available on the device itself from among the supported rates of the base station rate as the information for notifying the capability of the device itself to the base station. Meanwhile, it is considered that with regard to the mandatory rates from among the supported rates, a terminal that is connected to the base station has the capability of executing the mandatory rates.

It is considered here that if notification of some piece or pieces of information among the pieces of information mentioned above leads to definition of the content of another piece or other pieces of information, then notification of the other piece or pieces of information may be omitted. For example, suppose a case where a terminal is always an OFDMA-compliant terminal if a capability that is compliant with a new standard or specifications is defined and as long as the terminal is compliant with that capability or specifications. In this case, as the above certain piece or pieces of information, presence of the capability to be compliant with the standard or specification is notified, and as the other piece or pieces of information, notification of the fact that the terminal is an OFDMA-compliant terminal does not need to be explicitly performed.

Figure 4:
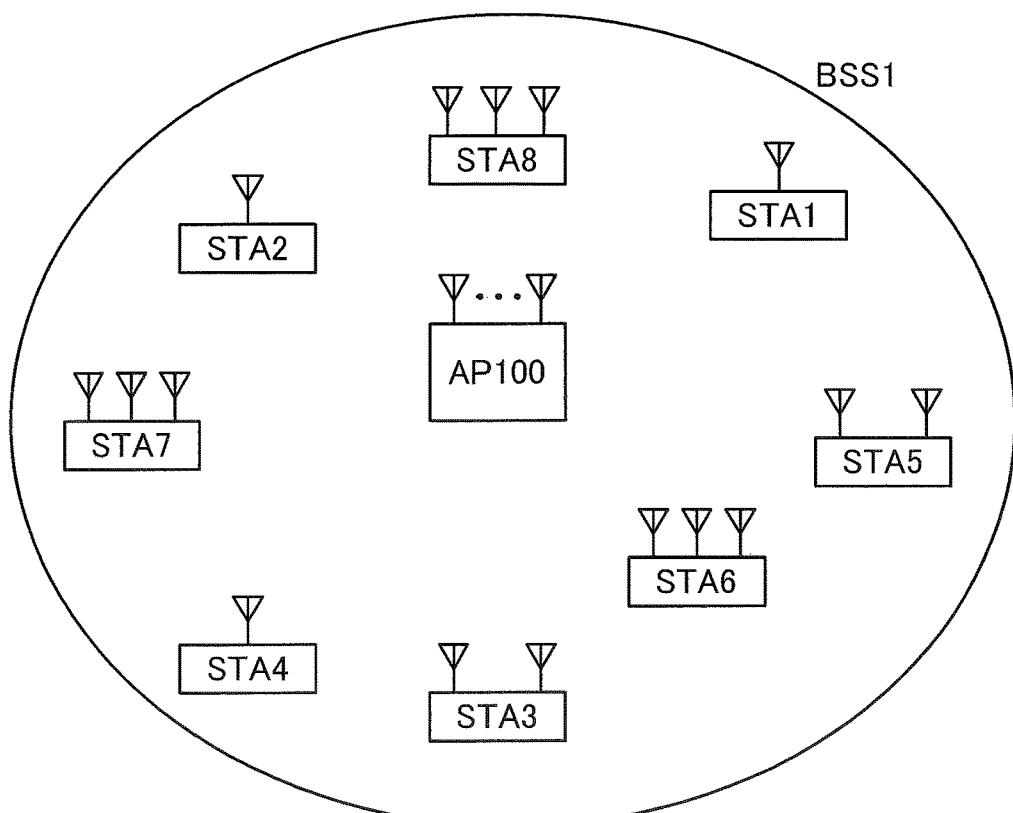
FIG. 4 is a diagram showing a wireless communication group including a base station and plural terminals.

FIG. 4 illustrates a wireless communication system in accordance with this embodiment. This system includes the base station (AP: Access Point) 100 and a plurality of terminals (STA: STAtion) 1 to 8. The BSS (Basic Service Set) 1 is formed by the base station 100 and the terminals 1 to 8 operating under the base station 100. This system is a wireless LAN system compliant with IEEE 802.11 standard using CSMA/CA (Carrier Sense Multiple Access with Carrier Avoidance). It is considered here that legacy terminals (IEEE 802.11a/b/g/n/ac standard-compliant terminals, etc.) other than the terminals (OFDMA terminals) in accordance with this embodiment may exist within the BSS 1.

Figure 5:
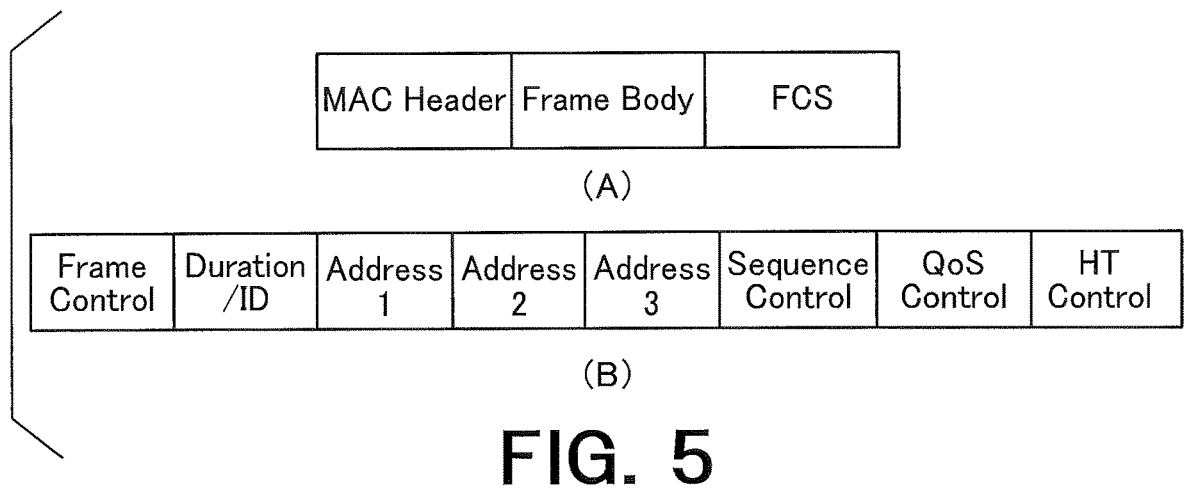
FIG. 5 is a diagram showing an exemplary basic format of a MAC frame.

FIG. 5(A) illustrates the basic exemplary format of the MAC frame. The data frame, the management frame, and the control frame in accordance with this embodiment are based on a frame format of this type. This frame format includes the fields of MAC header, Frame body, and FCS. The MAC header includes, as illustrated in FIG. 5(B), the fields of Frame Control, Duration/ID, Address 1, Address 2, Address 3, Sequence Control, QoS Control, and HT (High Throughput) Control.

These fields do not need to always exist and there may be cases where some of these fields do not exist. For example, there may be a case where the Address 3 field does not exist. Also, there may be other cases where both or either one of the QoS Control field and the HT Control field does not exist. Also, there may be still other cases where the frame body field does not exist. Also, any field or fields that are not illustrated in FIG. 5 may exist. For example, an Address 4 field may further exist. Also, an RU/AID field which will be described later may exist in the MAC header or the frame body field. In a case of the trigger frame described later, a common information field and a terminal information field may exist in a frame body field or a MAC header.

The field of Address 1 indicates Receiver Address (RA), the field of Address 2 indicates Transmitter Address (TA), and the field of Address 3 indicates either BSSID (Basic Service Set IDentifier) which is the identifier of the BSS, or TA, depending on the purpose of the frame. The BSSID may be a wildcard BSSID whose bits are all set to 1 to cover all of the BSSIDs depending on the cases.

As described above, two fields of Type and Subtype (Subtype) or the like are set in the Frame Control field. The rough classification as to whether it is the data frame, the management frame, or the control frame is made by the Type field, and more specific types, for example, fine discrimination among the roughly classified frames, for example, as to whether it is a BA frame, a BAR frame or CTS frame within the control frame, or a beacon frame within the management frame is made by the Subtype field. The trigger frame which will be described later may also be discriminated by the combination of the Type and the Subtype. It is likely that the trigger frame is categorized as the control frame.

The Duration/ID field describes the medium reservation time, and it is determined that the medium is virtually in the busy state from the end of the physical packet including this MAC frame to the medium reservation time when a MAC frame addressed to another terminal is received. The scheme of this type to virtually determine that the medium is in the busy state, or the period during which the medium is virtually regarded as being in the busy state, is, as described above, called NAV (Network Allocation Vector). The QoS field is used to carry out QoS control to carry out transmission with the priorities of the frames taken into account. The HT Control field is a field introduced in IEEE802.11n.

Figure 6:
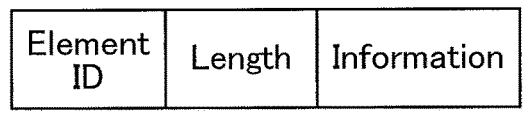
FIG. 6 is a diagram showing an exemplary format of an information element.

In the management frame, an information element (Information element; IE) to which a unique Element ID (IDentifier) is assigned is set in the Frame Body field. One or a plurality of information elements subsequent to a specific field depending on the type of the management frame may be set in the frame body field. The information element has, as illustrated in FIG. 6, the fields of an Element ID field, a Length field, and an Information field. The information element is discriminated by the Element ID. The Information field is adapted to store the content of the information to be notified, and the Length field is adapted to store the length information of the information field.

Frame check sequence (FCS) information is set in the FCS field as a checksum code for use in error detection of the frame on the reception side. As an example of the FCS information, CRC (Cyclic Redundancy Code) may be mentioned.

Figure 7:
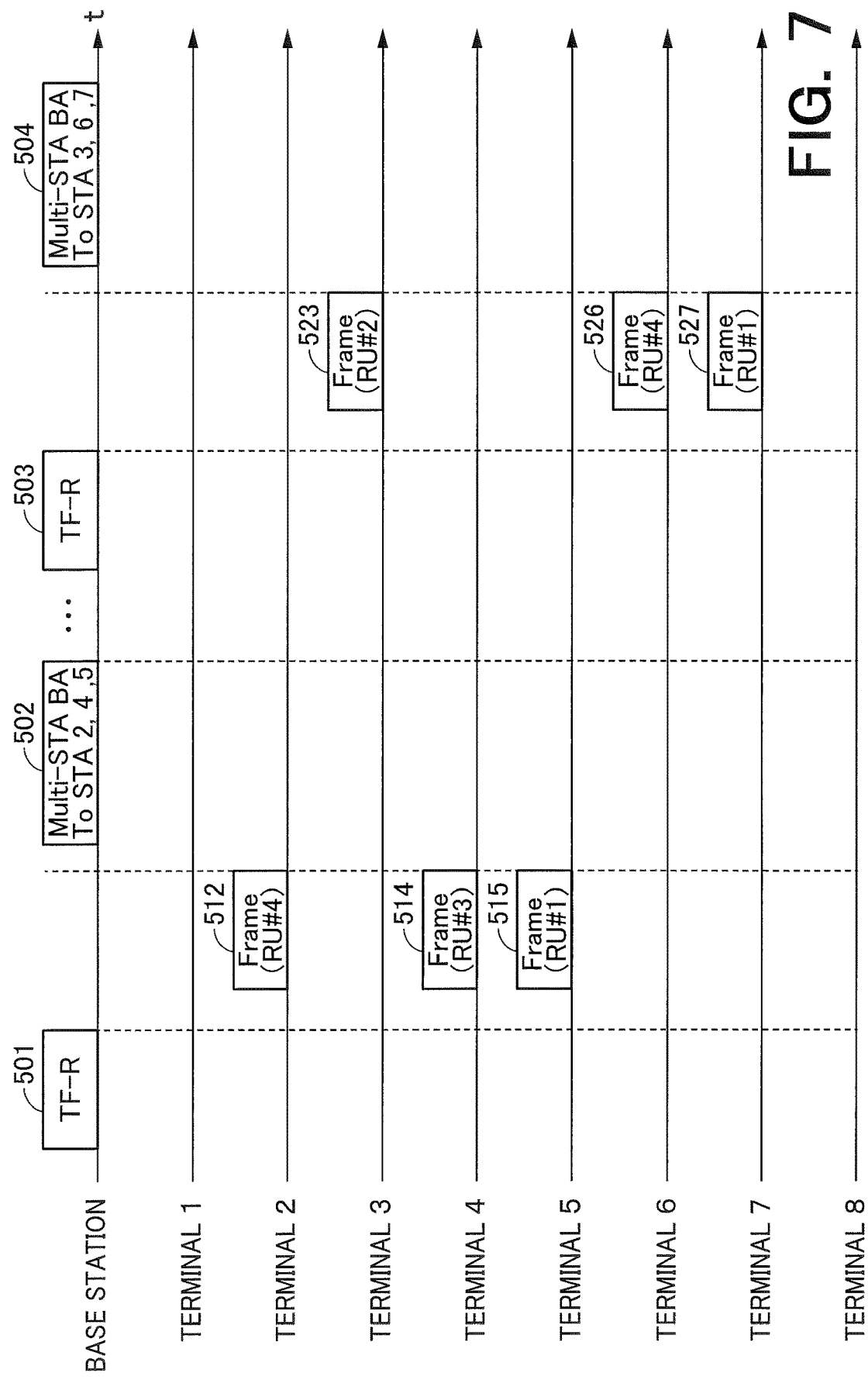
FIG. 7 is a diagram showing an example of a basic operational sequence according to the embodiment of the invention.

FIG. 7 shows an exemplary operational sequence of a base station (AP) 101 and plural terminals including a terminal (STA) 1 to a terminal (STA) 8 according to the embodiment. Each of the terminals 1 to 8 is an OFDMA-compliant terminal. FIG. 7 shows a basic operational sequence according to the embodiment and a description of an operation relating to features of the embodiment is given later by means of another exemplary operational sequence (see FIG. 14).

In this exemplary operation sequence, as its premise, CSMA/CA-based communications are individually carried out (single user communications) between the base station and all or part of the terminals 1 to 8. In the single user communications, communications are carried out between the base station and the terminals, for example, on one channel with the basic channel width (for example, 20

Figure 8:
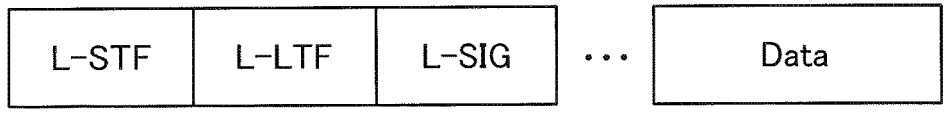
FIG. 8 a diagram showing an exemplary format of a physical packet.

MHz). As one example of the single user communications, when data for uplink transmission is held by the terminal, the right to access the wireless medium is acquired in accordance with CSMA/CA. As a result, the terminal carries out carrier sense for the carrier sense time (standby time) during the DIFS/AIFS[AC] and a randomly defined back-off time, and when it has been determined that the medium (CCA) is in the idle state, the terminal acquires the right to access to transmit, for example, one frame. The terminal transmits the data frame (more specifically, a physical packet including the data frame). When the base station has received this data frame successfully, then the base station returns an ACK frame (more specifically, a physical packet including the ACK frame) which is a delivery confirmation response (acknowledgement) frame after the elapse of SIFS time after completion of reception of the data frame. The terminal upon reception of the ACK frame determines that the transmission of the data frame has been successful. It is considered here that the data frame to be transmitted to the base station may be an aggregation frame (A-MPDU, etc.), and the delivery confirmation response frame by which the base station respond may be a BA frame (this also applies to the following explanations). It is considered here that the DIFS/AIFS [AC] time refers to either the DIFS time or the AIFS [AC] time. When the terminal is not QoS-compliant, the DIFS/AIFS [AC] time refers to the DIFS time. When the terminal is QoS-compliant, the DIFS/AIFS [AC] time refers to the AIFS [AC] time which is defined in accordance with the access category (AC) (to be later described) of the data to be transmitted. Note that the physical packet has a basic structure in which the physical header is added to the MAC frame stored in a data field as shown in FIG. 8 described later.

The base station decides to start UL-OFDMA at any timing. This example contemplates a case where UL-OFDMA transmission is performed by the same channel as that of the single user communication (one channel with the basic channel width of 20 MHz). In other words, it is considered in this example that the UL-OFDMA transmission is performed using a plurality of resource units defined within the channel with the basic channel width of 20 MHz. Nevertheless, it is also possible to use other channel widths such as 40 MHz, 80 MHz, etc. to perform the UL-OFDMA transmission.

The base station, when deciding to start the UL-OFDMA, transmits the trigger frame for UL-OFDMA, more specifically, the trigger frame for random access (further specifically, the physical packet including the trigger frame for random access) 501.

The trigger frame for random access 501 defines that all or at least a part of the plural resource units offered for UL-OFDMA can be used by any terminal(s). The resource units are not assigned to specific terminals (the resource units are not limited to specific terminals). Such a resource unit may be called an "STA-unspecified RU". However, the trigger frame may define that resource units except STA-unspecified RUs out of the plural resource units offered for UL-OFDMA are allocated to specific terminals. In this case, the resource units except the STA-unspecified RUs are used by only the specific terminals. That is, the STA-unspecified RU is a resource unit which is permitted to be selected randomly and used (uplink transmission) among plural terminals. The trigger frame specifying the STA-unspecified RUs for at least a part of the resource units is called the trigger frame for random access. The trigger frame for random access is represented by "TF-R" in the figure.

When the trigger frame for random access 501 is transmitted, the base station acquires the access right in advance based on the CSMA/CA. The trigger frame for random access 501 is transmitted at a channel having the basic channel width which is the same channel width as that of the single-user communication. The physical packet including the trigger frame for random access has the physical header added to the head of the trigger frame for random access. The physical header includes, as an example, an L-STF (Legacy-Short Training Field), an L-LTF (Legacy-Long Training Field), and an L-SIG (Legacy Signal Field) which are defined by IEEE802.11 standard, as shown in FIG. 8. Each of the L-STF, the L-LTF, and the L-SIG is a field (legacy field) successful in being recognized by a terminal corresponding to a legacy standard such as IEEE802.11a, for example, and information such as information for signal detection, information for frequency correction (channel estimation), and information on transmission rate is stored therein, respectively. Fields other than those described here (e.g., a field that cannot be recognized by a legacy terminal but can be recognized by an OFDMA-compliant terminal) may be included. Note that the trigger frame for random access 501 may be a frame successful in being received and decoded by a legacy terminal as well as an OFDMA-compliant terminal.

Figure 9:
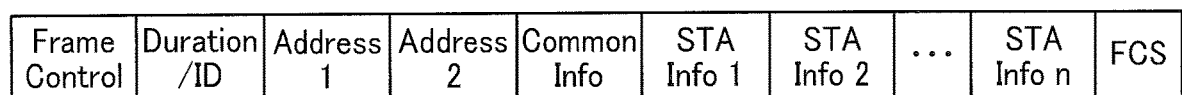
FIG. 9 is a diagram showing an exemplary format of a trigger frame (including a case of a trigger frame for random access)
Figure 10:
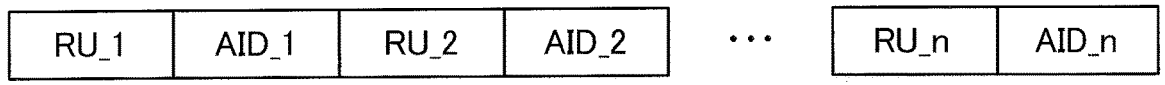
FIG. 10 is a diagram showing an exemplary structure of an RU/AID field.

FIG. 9 is a diagram showing an exemplary format of the trigger frame (including a case of the trigger frame for random access). This has a format of a general MAC frame as a base shown in FIG. 5 and includes the Frame Control field, the Duration/ID field, the Address 1 field, and the Address 2 field, the common information field (Common Info.) field, plural terminal information (STA Information: STA Info) fields and the FCS field. The frame is specified to be the trigger frame by the Type and Subtype fields in the Frame Control field. The Type is "control" as an example, and the Subtype may define a new value corresponding to the trigger frame. However, the trigger frame can be defined with the Type being "management" or "data". Note that, instead of defining a new value as the Subtype, a reserved field of the MAC header can be used as a field notifying that a frame is the trigger frame. The Address 1 field may be set to a broadcast address or a multicast address as an RA. The Address 2 field may be set to a MAC address of the base station (BSSID) as a TA. However, the Address 1 field or the Address 2 field, or both of them may be omitted in some cases. The common information field is set to notify information common to the plural terminals. For example, information specifying a format of the terminal information field, information specifying a length of the packet transmitted in response, information representing an intended purpose (or use application) of the trigger frame, and information specifying a type of the frame to be transmitted in response to the trigger frame can be also set therein. Information on the number of the terminal information fields can be also set therein. Each of the plural terminal information fields set information which is to be notified to each of the plural terminals. A detailed structure of the terminal information fields 1 to n is shown in FIG. 10. Each of the terminal information fields 1 to n includes an RU field and an AID field.

Each of terminal information fields 1 to n includes a pair (set) of the RU field (RU_1 to RU_n) and the AID field (AID_1 to AID_n) as an example. The RU field is set to an identifier of a resource unit that can be used. The AID field is set to an identifier (AID) of the terminal assigned to the resource unit or information indicating that usage of the resource unit is specified to no specific terminal (i.e., STA-unspecified RU). In the embodiment, the information that the usage is specified to no specific terminal is represented by X as a value of an unused AID. X is a value of the AID not assigned to any terminal, and has a value defined beforehand in the system or by the standard, or a value arbitrarily defined by the base station. The value of X may be notified by means of a management frame such as a beacon frame from the base station to the terminals. The resource unit having X set therein is a resource unit which may be used by any terminal, that is, the resource unit for random access or STA-unspecified RU.

Note that the terminal whose identifier is set in any of the AID fields may be permitted to use or permitted not to use the resource unit for random access in addition to the resource unit specified to use. The embodiment describes an aspect that if a terminal is allocated a specific resource unit, the terminal does not use the resource unit for random access (STA-unspecified RU): however, the embodiment is not necessarily limited thereto.

Note that the usage of the resource unit for random access may be limited to a plurality of specific terminals or a group having a specific group ID. In the latter case, the AID field may be set to the group ID. In the former case, a plurality of AIDs may be set for one RU field. Other method than those described here may be used.

Note that n (the number of sets of the RU field and the AID field) may be fixed or variable. In the case of the variable value, a value of n may be set in the common information field or a field notifying the end of the RU/AID field may be provided. The field notifying the end may be a field set to a special value which is not any of possible values of the sets of the identifier of the resource unit and the AID. The terminal information field may include a field other than the RU field and AID field. For example, fields set information specifying a transmission power, a MCS and the like used by the terminal may be included.

Hereinafter, an example is shown in which a frame format having such a RU/AID field structure like this is used to make the plural terminals select the resource units randomly and transmit frames.

The trigger frame for random access (TF-R) 501 transmitted from the base station is received by terminals 1 to 8. In this example, the trigger frame for random access 501 specifies four resource units (RU #1, RU #2, RU #3, and RU #4), and every resource unit has the AID set to X. In other words, RU #1 to RU #4 are STA-unspecified RUs. However, the trigger frame for random access 501 may specify more resource units, or an AID of a specific terminal may be specified for a part of the resource units.

Each of the terminals 1 to 8 decodes the trigger frame for random access 501 to check whether or not the usage of any of four resource units RU #1 RU #2, RU #3, and RU #4 is specified to its own terminal, and determines that all the resource units are the resource unit for random access (STA-unspecified RU) since here every resource unit has the AID set to X. This determination is made by a MAC processor 10 (e.g., a reception processor 30 or a MAC common processor 20), or a MAC/PHY manager 60.

Each of terminals 1 to 8 holds a backoff count (UL-OFDMA Backoff (OBO) Count) selected randomly from a value range being not more than a contention window for UL-OFDMA (CWO) value. More specifically, the backoff count selected from a value range from 0 to the CWO value is held. The CWO corresponds to information concerning a value range. In this example, a size of the value range is equal to CWO (=CWO−0). The lower limit of the value range may not be zero. The minimum value of the CWO is expressed as CWOmin, and the maximum value of the CWO is expressed as CWOmax. The CWO is selected from a range from the CWOmin to the CWOmax. Here, 31 is selected as a predetermined initial value of the CWO. The CWO, the backoff count (OBO count), the CWOmin, and the CWOmax may be managed by the MAC processor 10, the MAC/PHY manager 60 or the like, and these values may be stored in a memory accessible to the MAC processor 10, the MAC/PHY manager 60 or the like.

Each of the terminals 1 to 8 subtracts, from its backoff count, the number of STA-unspecified RUs which is specified in the trigger frame for random access 501 to update the OBO. If the OBO after the update reaches a predetermined value, the terminal acquires a right to select the STA-unspecified RU randomly (the right to select may be called a selection right below) and selects the STA-unspecified RU randomly. Thereby, the terminal acquires an access right to the selected STA-unspecified RU. In the embodiment, the predetermined value is 0. If a subtraction result is below 0, the OBO after the update is rounded up to 0. In this way, if the OBO count after the update reaches 0, the terminal acquires the selection right. In other words, when the trigger frame for random access is received, the OBO count is subtracted by 1 (OBO count−1), and if the resulted value is equal to or less than a value obtained by subtracting 1 from the number of STA-unspecified RUs in the trigger frame for random access (the number of STA-unspecified RUs−1), the selection right is acquired. In other words further, if the OBO count when the trigger frame for random access is received (OBO count before the subtraction) is equal to or less than the number of STA-unspecified RUs in the trigger frame for random access, the selection right is acquired. The update of the OBO and the determination on the selection right acquisition are made by the MAC processor 10 (e.g., the MAC common processor 20 or the reception processor 40), or the MAC/PHY manager 60.

Here, any terminals 1 to 8 are assumed to have an uplink transmission request. The terminal having the transmission request holds the backoff count selected from the range being not more than the CWO value as described above. The first selection of the backoff count may be made when the transmission request is generated before receiving the trigger frame for random access 501, or may be triggered by the reception of the trigger frame for random access 501. If another trigger frame for random access is received before the trigger frame for random access 501 is received, the OBO count after the subtraction at that time may be used as the OBO count (the OBO count before the subtraction this time) when the trigger frame for random access 501 is received.

Figure 11:
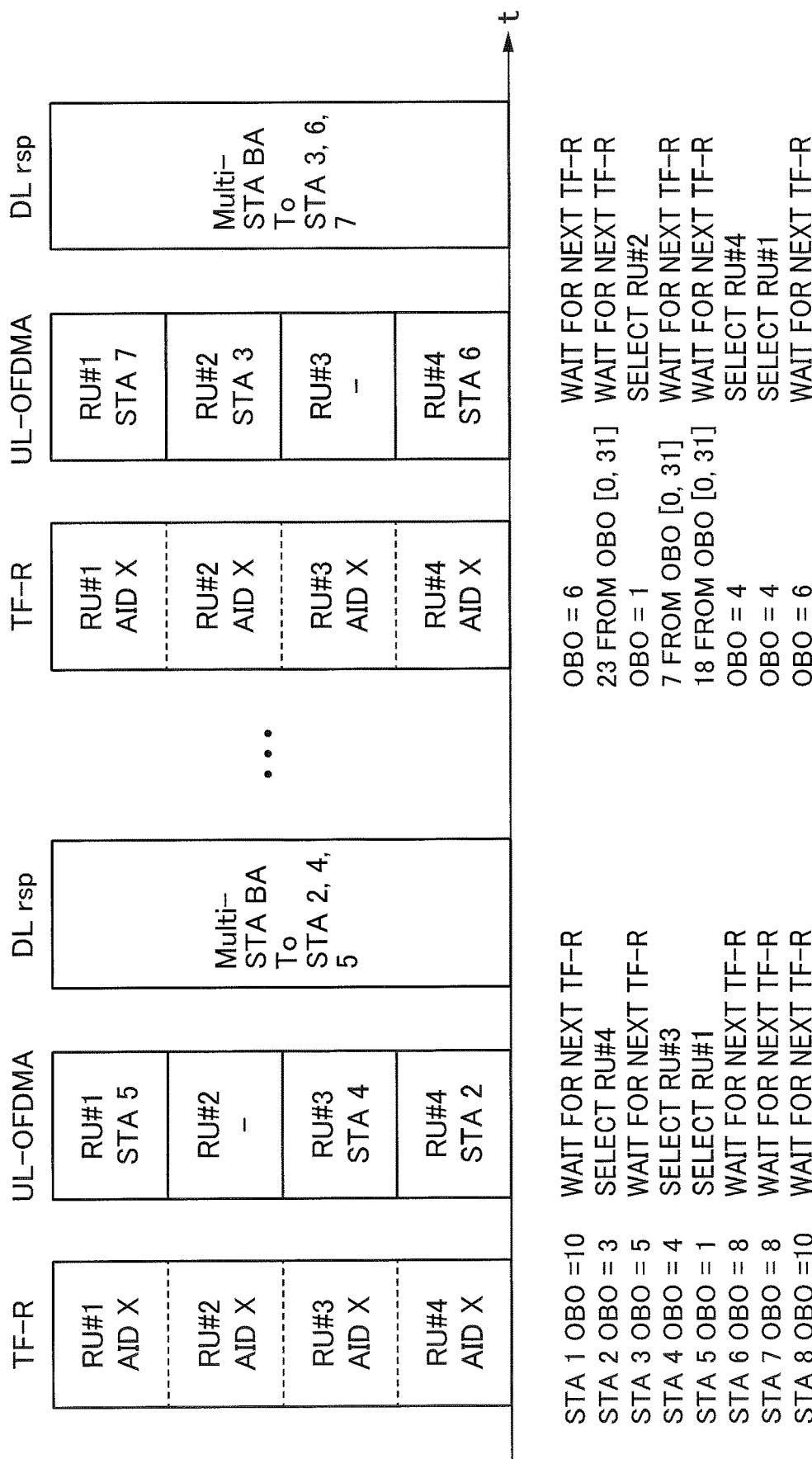
FIG. 11 is a supplementary illustration of the operational sequence in FIG. 7.

FIG. 11 is a supplementary illustration for explaining the sequence in FIG. 7, and a lateral direction along a paper plane corresponds to time and a longitudinal direction corresponds to frequency. The OBO counts of the terminals 1 to 8 (STAs 1 to 8) are STA 1 OBO=10
STA 2 OBO=3
STA 3 OBO=5
STA 4 OBO=4
STA 5 OBO=1
STA 6 OBO=8
STA 7 OBO=8
STA 8 OBO=10

The number of STA-unspecified RUs is 4 in the trigger frame for random access 501, and thus, the OBO counts after the update (subtraction) obtained by subtracting 4 from them are as below. The value below 0 is fixed to 0.

STA 1 OBO=10−4=6
STA 2 OBO=3−4=−1 (→0)
STA 3 OBO=5−4=1
STA 4 OBO=4−4=0
STA 5 OBO=1−4=−3 (→0)
STA 6 OBO=8−4=4
STA 7 OBO=8−4=4
STA 8 OBO=10−4=6

Terminals 2, 4, and 5 have the OBO count after the update reaching a predetermined value (=0), and thus, terminals 2, 4, and 5 acquire the selection right. Each of terminals 2, 4, and 5 selects the resource unit randomly from RU #1 to RU #4 being STA-unspecified RUs which are specified in the trigger frame for random access 501. Here, assume that terminal 2 selects RU #4, terminal 4 selects RU #3, and terminal 5 selects RU #1. The resource unit to select is one, but two or more may be permitted to be selected. Other terminals than terminals 2, 4, and 5, which have the OBO count after the update larger than 0, cannot acquire the selection right, and wait for the next transmitted trigger frame for random access. Note that the process of selecting the resource unit may be made by the MAC processor 10 (e.g., the MAC common processor 20, the reception processor 40, or the transmission processor 30), or the MAC/PHY manager 60.

Terminals 2, 4, and 5 use RU #4, RU #3, and RU #1 to transmit frames 512, 514, and 515, respectively, after elapse of a predetermined time period (assuming T1) from completion of receiving the trigger frame for random access 501. The frames transmitted may be those of a predetermined kind or the frames arbitrarily decided by the terminals. Examples of the frames of a predetermined kind may include a UL-OFDMA allocation request frame (a frame notifying that there is a request of data transmission when a resource unit is allocated to its own terminal by a trigger frame). In this case, frames having a fixed length may be used to unify the lengths of frames transmitted by the terminals (more specifically, the packet lengths of the physical packets including the frames). Parameter information such as the packet length, MCS or the like for each terminal may be specified in the terminal information field, common information field, or the like in the trigger frame for random access 501 such that each terminal generates the frame in accordance with the parameter information and transmits the frame (more specifically, the physical packet including the frame). If the packet length does not reach the specified value, padding data may be added to adjust the packet length. Note that since RU #2 is not selected by any terminal, the transmission is not performed by use of RU #2. If other resource unit than RU #1 to RU #4 exists and that resource unit is specified for another terminal in the trigger frame for random access 501, the terminal may transmit a frame using the specified resource unit. In this case, the terminal and terminals 2, 4, and 5 are to simultaneously perform the uplink transmission (UL-OFDMA transmission). Note that the frames transmitted from terminals 2, 4, and 5 may be an aggregation frame (A-MPDU), where frames such as the plural data frames (i.e., MPDUs or sub-frames) aggregated.

As for the time period T1, an IFS time [μs] defined beforehand may be used, as an example. The IFS time defined beforehand may be an SIFS time (=16 μs) that is a time interval of inter-frame defined by the MAC protocol specification for IEEE802.11 wireless LAN, or may be a time larger or smaller than this. A value of the time period T1 may be stored in the common information field, a MAC header, or the like in the trigger frame such that the terminal reads out this value to use. Besides, the time period T1 may be notified in advance in another way such as the beacon frame, other management frames, or the like.

The base station receives and decodes frames 515, 514, and 512 transmitted from terminals 5, 4, and 2 in RU #1, RU #3 and RU #4 and subjects the decoded frames to a FCS check (e.g., CRC check) to determine whether or not the frames are successfully received. The base station generates and transmits (downlink response) an acknowledgement response frame 502 depending on check results (success or failure of the reception) of the frames. Here, single acknowledgement response frame 502 is transmitted which represents acknowledgements for all the terminals 2, 4, and 5. A format of the acknowledgement response frame like this may be newly defined or the Multi-STA BA frame obtained by diverting the BA (Block Ack) frame thereto may be used. Here, the Multi-STA BA frame is transmitted.

Figure 12:
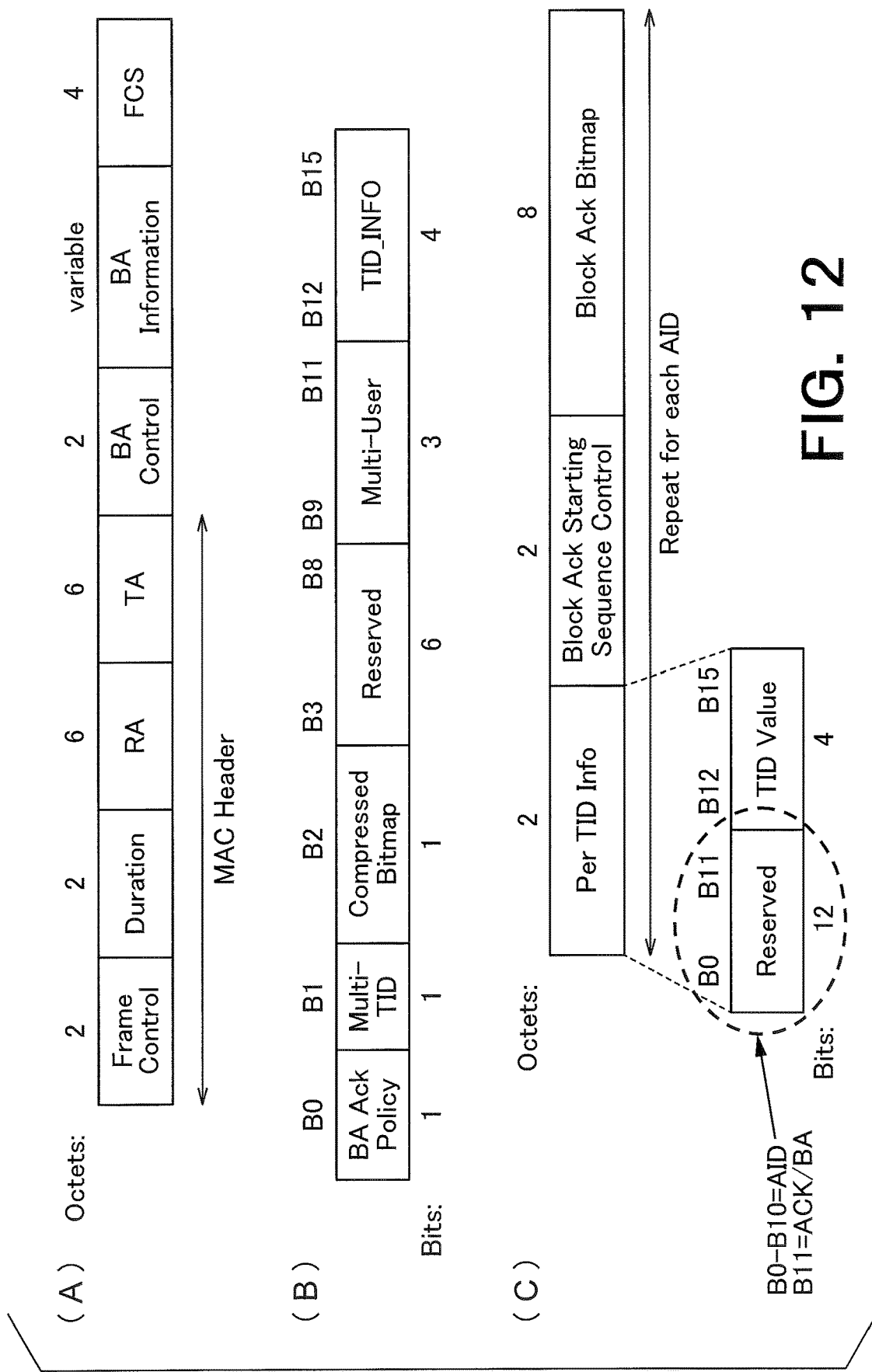
FIG. 12 is an illustration of a Multi-STA BA frame.

A description is given of the Multi-STA BA frame here. The Multi-STA BA frame is obtained by diverting the Block Ack frame (BA frame) thereto in order to make the acknowledgement to plural terminals by one frame. A frame type may be "Control" similarly to the ordinary BA frame, and a frame subtype may be "BlockAck". FIG. 12(A) shows an exemplary frame format in the case of reusing the Multi-STA BA frame. FIG. 12(B) shows an exemplary frame format of a BA Control field of the BA frame, and FIG. 12(C) shows an exemplary frame format of a BA Information field of the BA frame. In the case of reusing the BA frame, an indication may be in the BA Control field that the BA frame format is that extended for notifying the acknowledgement response regarding the plural wireless terminals. For example, in IEEE802.11 standard, a case where a Multi-TID subfield is 1 and a Compressed Bitmap subfield is 0 is reserved. This may be used in order to indicate that the BA frame format is extended for notifying the acknowledgement response regarding to plural wireless terminals. Alternatively, an area of bits B3-B8 is a reserved subfield in FIG. 12(B), but all or a part of this area may be defined in order to indicate that the BA frame format is that extended for notifying the acknowledgement response regarding to plural wireless terminals. Alternatively, the notification as described here may not be necessarily made explicitly.

The RA field of the Multi-STA BA frame may be set to a broadcast address or a multicast address as an example. A Multi-User subfield in the BA Control field may be set to the number of the users (number of the terminals) to be reported by means of the BA Information field. In the BA Information field, there are arranged for each user (terminal), an Association ID subfield, a Block Ack Starting Sequence Control subfield, and a Block Ack Bitmap subfield.

The Association ID subfield is set to the AID for identifying the user. More specifically, as an example, a part of a Per TID Info field is used as the subfield for the Association ID as shown in FIG. 12(C). Currently, 12 bits (from B0 to B11) are a reserved area. The first 11 bits (B0-B10) of these are used as the subfield for the Association ID. The Block Ack Starting Sequence Control subfield and the Block Ack Bitmap subfield may be omitted if the frame transmitted by the terminal is a single data frame (that is, it is not an aggregation frame). If the frame transmitted by the terminal is an aggregation frame, the Block Ack Starting Sequence Control subfield has stored therein a sequence number of the first MSDU (medium access control (MAC) service data unit) in the acknowledgement response shown by the Block Ack frame. In the Block Ack Bitmap subfield, a bitmap (Block Ack Bitmap) constituted by bits each showing reception success or failure for the sequence numbers subsequent to the Block Ack Starting Sequence number is set.

The terminal receiving the Multi-STA BA frame 502 confirms the Type and Subtype of the Frame Control field. If the terminal detects that these are "Control" and "Block-Ack", then the terminal confirms the RA field. Since the value of the RA field is the broadcast address or the like, the terminal identifies, from the Block Ack Bitmap field, the information on the acknowledgement responses (success or failure) with respect to the MPDUs (sub-frames) in the frame (here, assumed that the frame is an aggregation frame) transmitted by its own terminal to determine transmission success or failure of each sub-frame. For example, the terminal identifies the TID Info subfield storing its AID from within the BA Information field, identifies the value (starting sequence number) set in the Block Ack Starting Sequence Control subfield subsequent to the identified TID Info subfield, and identifies from the Block Ack Bitmap the transmission success or failure of each of the sequence numbers subsequent to the starting sequence number. A bit length of the AID may be shorter than a length of the TID Info subfield, and the AID may be stored in a part of the area of the TID Info subfield (e.g., the first 11 bits (B0-B10) of 2 octets (16 bits)), for example.

The case where the plural terminals each transmits not the aggregation frame but a single frame by way of the UL-OFDMA (this case is assumed in the sequence in FIG. 7) may be made as below, for example. As shown in FIG. 12(C), one bit in the TID Info subfield of each BA Information field (e.g., the 12th bit (B11, if the first bit is B0) from the head of 2 octets (16 bits)) is used as a bit indicating "ACK" or "BA" (ACK/BA bit) and the bit is set to a value indicating "ACK". If the value indicating "ACK" is set, the Block Ack Starting Sequence Control subfield and the Block Ack Bitmap subfield are omitted.

This allows notification of "ACK" for the plural terminals by means of one BA frame. The terminal of which the check result is failure is not necessary to be notified of the ACK, and thus, the notification regarding the terminal may not be made in the Multi-STA BA frame. The terminal on the receiving side does not receive the ACK for its own terminal and can determine that it has failed in the transmission. In this way, even if the plural terminals transmit either the aggregation frame or the single frame, the acknowledgement can be made with respect to the plural terminals by means of the single acknowledgement response frame obtained by diverting the BA frame thereto.

The access point, in the case of transmitting the Multi-STA BA frame 502, may transmit the Multi-STA BA frame 502 at the same frequency band as the trigger frame for random access 501 or the UL-OFDMA, or at a bandwidth of the basic channel width of 20 MHz, for example.

As other method than of transmitting the Multi-STA BA frame, the acknowledgement response frame (ACK frame, BA frame, or the like) may be individually transmitted for each terminal. At this time, the DL-OFDMA may be used to simultaneously transmit the acknowledgement response frames to the plural terminals.

FIG. 13 shows an exemplary structure of the physical packet in the case where the acknowledgement response frames is transmitted to the plural terminals by way of the DL-OFDMA. The L-STF, L-LTF, and L-SIG fields are, as an example, transmitted at a channel width of 20 MHz and set to the same value (same symbol) for all acknowledgement response frames each terminal headed. The SIG 1 field sets common information for a plurality of terminals and specifies, for example, the resource unit to be used for the reception by each terminal. For example, information associating the terminal identifier with the resource unit number (identifier) is set. The terminal identifier may be the Association ID (AID), a part of the AID (Partial AID), or other identifier such as the MAC address. The SIG 1 field is also transmitted at a channel width of 20 MHz, as an example. Any of the terminals can decode the SIG 1 field. The SIG 2 field is individually set for each resource unit and information on the MCS and the like which is required for decoding the corresponding data field, as an example, may be set therein. Therefore, each terminal receiving the signal from the access point can detect, by decoding the SIG 1 field, the proper resource unit to be decoded by its own terminal. Each terminal decodes the resource unit specified to its own terminal to receive the acknowledgement response frame. Note that the exemplary format in FIG. 13 is an example, and one or more other fields may be arranged before or after the SIG 2 field, or before or after the SIG 1 field. The other fields may have a bandwidth of 20 MHz or a resource unit width. All or a part of the other fields may be constituted by known symbols similar to the L-STF and L-LTF.

As a method other than that of transmitting the acknowledgement response frames to the plural terminals by way of the DL-OFDMA, the acknowledgement response frames may be transmitted to the plural terminals by way of the downlink MU-MIMO. The DL-MU-MIMO uses a technology called beam forming to form beams spatially orthogonal to each other the plural terminals for performing the transmission. The DL-MU-MIMO may be performed in accordance with IEEE802.11ac standard based on which it is defined.

The base station, after transmitting the Multi-STA BA frame 502, transmits a trigger frame for random access 503 at a predetermined timing or an arbitrary timing. The trigger frame for random access 503 has a structure similar to the trigger frame for random access 501, and specifies RU #1 to RU #4 as the STA-unspecified RUs. Any transmission may be performed between the transmission of the Multi-STA BA frame 502 and the transmission of the trigger frame for random access 503. For example, the ordinary trigger frame (trigger frame not specifying the STA-unspecified RU) may be used to perform the UL-OFDMA communication.

Terminals 1 to 8 hold the OBO count (backoff count) updated when the trigger frame for random access 501 was received last time. However, terminals 2, 4, and 5 which performed the transmission in reply to the trigger frame for random access 501 (random access) again re-obtain the OBO count from the range from 0 to the CWO. Here, assume the CWO value is the same value 31 as that used at last time. Then, assume that terminals 2, 4, and 5 select, from [0, 31], 23, 7, and 18, respectively. Therefore, the OBO counts of terminals 1 to 8 (STAs 1 to 8) are as below.

STA 1 OBO=6
STA 2 OBO=23
STA 3 OBO=1
STA 4 OBO=7
STA 5 OBO=18
STA 6 OBO=4
STA 7 OBO=4
STA 8 OBO=6

The number of STA-unspecified RUs is 4 in the trigger frame for random access 503, and thus, the OBO counts after the update (subtraction) obtained by subtracting 4 from the OBO counts of the terminals are as below. The value below 0 is fixed to 0.

STA 1 OBO=6−4=2
STA 2 OBO=23−4=19
STA 3 OBO=1−4=−3 (→0)
STA 4 OBO=7−4=3
STA 5 OBO=18−4=14
STA 6 OBO=4−4=0
STA 7 OBO=4−4=0
STA 8 OBO=6−4=2

Terminals 3, 6, and 7 have the OBO count after the update reaching a predetermined value (=0 ), and thus, terminals 3, 6, and 7 acquires the selection right. Each of the terminals 3, 6, and 7 selects the resource unit randomly from RU #1 to RU #4 being STA-unspecified RUs which are specified in the trigger frame for random access 503. Here, assume that terminal 3 selects RU #2, terminal 6 selects RU #4, and terminal 7 selects RU #1. The resource unit to select is one, but two or more may be permitted to be selected. Other terminals than terminals 3, 6, and 7, which have the OBO count after the update larger than 0, cannot acquire the selection right, and wait for the next transmitted trigger frame for random access.

Terminals 3, 6, and 7 use RU #2, RU #4, and RU #1 to transmit frames 523, 526, and 527, respectively, after elapse of a predetermined time period from completion of receiving the trigger frame for random access 503. The frames transmitted may be those of a predetermined kind or the frames arbitrarily decided by the terminals. Note that since RU #3 is not selected by any terminal, the transmission is not performed in RU #3. If other resource unit than RU #1 to RU #4 may be specified for another terminal in the trigger frame for random access 503, and in that case, the terminal may transmit a frame by use of the specified resource unit. In this case, the terminal and terminals 3, 6, and 7 are to simultaneously perform the uplink transmission (UL-OFDMA transmission). Note that the frames transmitted from terminals 3, 6, and 7 may be an aggregation frame (A-MPDU), where frames such a plural data frames (i.e., MPDUs or sub-frames) being aggregated.

The base station receives and decodes frames 527, 523, and 526 transmitted from terminals 7, 3, and 6 by use of RU #1, RU #2 and RU #4 and subjects the decoded frames to the FCS check (e.g., CRC check) to determine whether or not the frames are successfully received. The base station generates and transmits (downlink response) an acknowledgement response frame depending on check results (success or failure of the reception) of the frames. Similarly to the above description, here, a Multi-STA BA frame 504 is transmitted as the single acknowledgement response frame which represents acknowledgements for all the terminals 3, 6, and 7. The operation of the terminal having received the Multi-STA BA frame 504 is the same as in the case of the Multi-STA BA frame 502.

Figure 14:
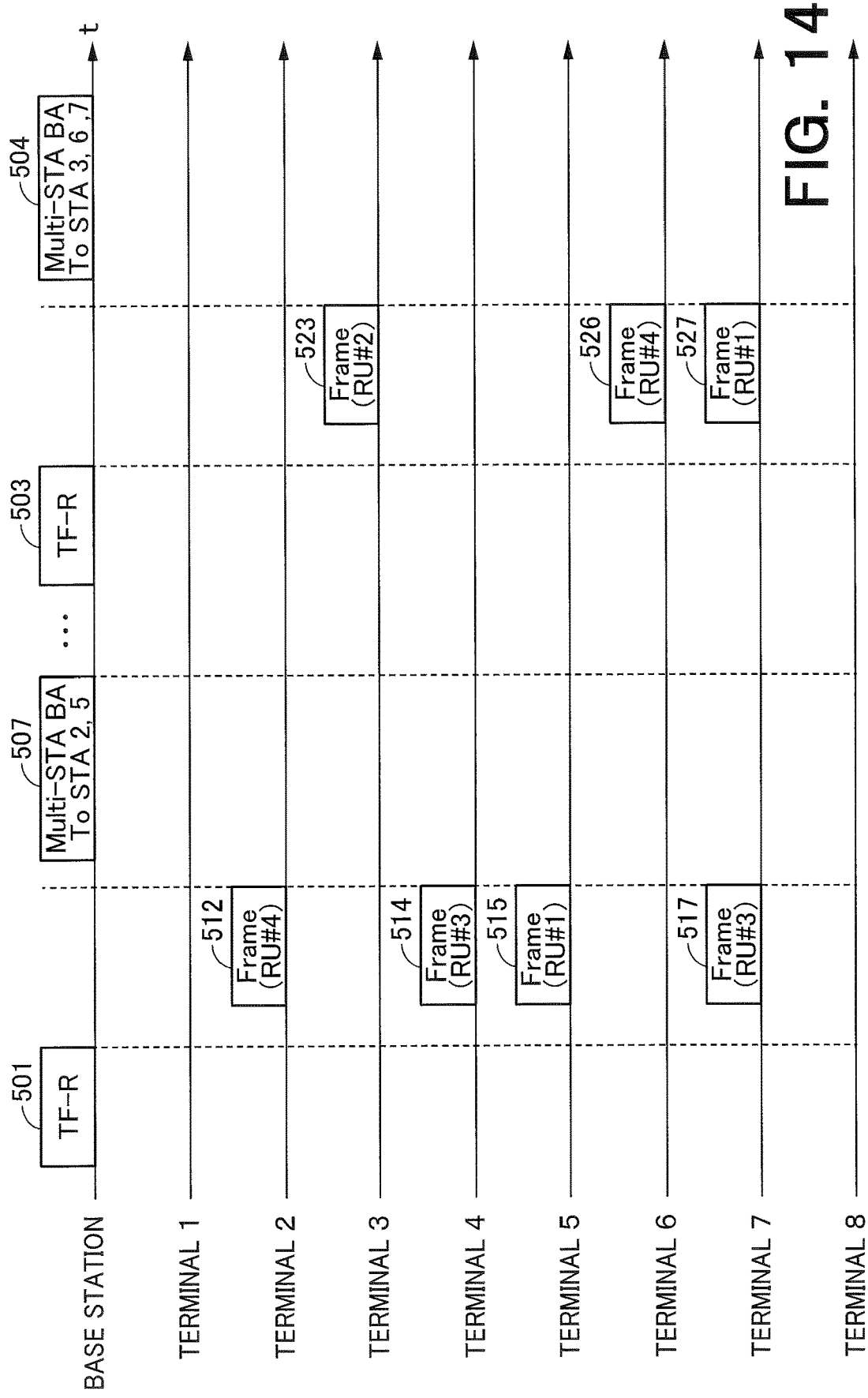
FIG. 14 is a diagram showing an example of an operational sequence according to the embodiment of the invention.
Figure 15:
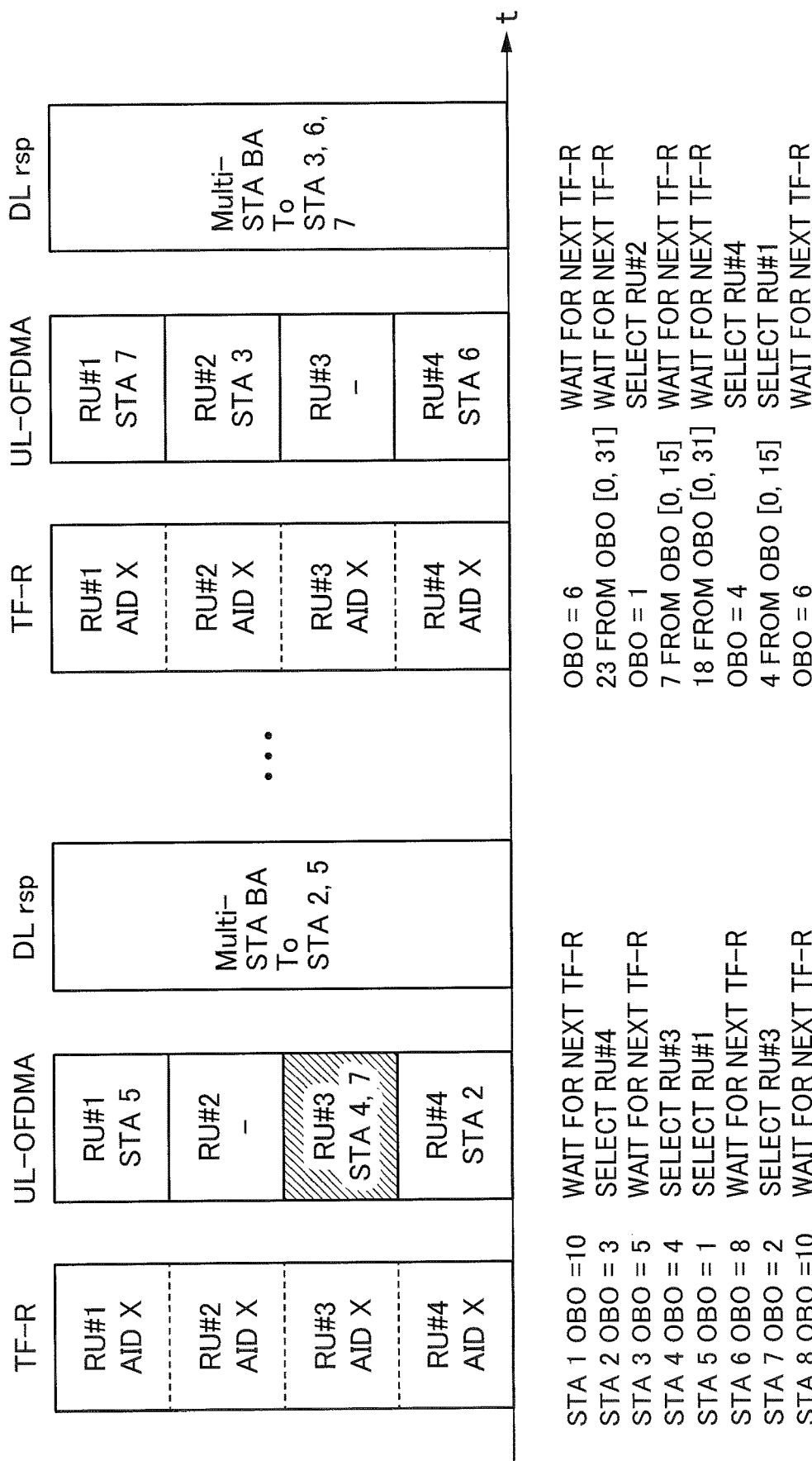
FIG. 15 is a supplementary illustration of the operational sequence in FIG. 14.

Based on the description above, a description is given of a sequence of the operation relating to features of the embodiment. FIG. 14 shows an example of the sequence. Elements the same as or corresponding to those in FIG. 7 are designated by the same reference signs. FIG. 15 is a supplementary illustration for explaining the sequence in FIG. 14. In the exemplary sequence in FIG. 7 as described previously, when each of the plural terminals acquiring the selection right to the STA-unspecified RU selects the resource unit randomly, the resource units selected by the terminals are different. For this reason, the frames transmitted from the terminals are successfully received by the base station. In contrast to this, in the exemplary sequence in FIG. 14, assume that the terminals select the same resource unit, and the base station cannot successfully receive the frames transmitted from the plural terminals. In such a case, the embodiment has a feature that the CWO value is adjusted such that a priority for acquiring the selection right for the terminal having failed in the transmission is heightened (in FIG. 7 described previously, the CWO value was fixed to 31). As an example, in this sequence, the CWO value is lowered than the last time CWO value for the terminal having failed in the transmission. The control like this keeps the fairness between the terminals. Hereinafter, the sequence in FIG. 14 is described in detail. A description is mainly given of differences from that for FIG. 7 and the description overlapping that for FIG. 7 is omitted.

The base station, when deciding to start the UL-OFDMA, transmits the trigger frame for random access (TF-R) 501. The trigger frame for random access 501 specifies four resource units (RU #1, RU #2, RU #3, and RU #4), and every resource unit has the AID set to X in the AID field as the STA-unspecified RUs.

Each of the terminals 1 to 8 decodes the trigger frame for random access 501 and determines that none of four resource units RU #1 RU #2, RU #3, and RU #4 is specified to its own device and all the resource units are the resource unit for random access since here every resource unit has the AID set to X.

Each of the terminals 1 to 8 holds the backoff count (OBO count) selected from a value range from 0 to the CWO value. The CWO is selected from a range between the CWOmin and the CWOmax. Here, assume that every terminal selects the initial value CWOinit (=31). Each of terminals 1 to 8 subtracts the number of STA-unspecified RUs in the trigger frame for random access 501 from its backoff count to update its OBO count. If the OBO count after the update reaches a predetermined value (here, 0), the relevant terminal acquires the selection right to the STA-unspecified RU.

Here, the OBO counts of terminals 1 to 8 (STAs 1 to 8) are
STA 1 OBO=10
STA 2 OBO=3
STA 3 OBO=5
STA 4 OBO=4
STA 5 OBO=1
STA 6 OBO=8
STA 7 OBO=2
STA 8 OBO=10

The number of STA-unspecified RUs is 4 in the trigger frame for random access 501, and thus, the OBO counts after the update obtained by subtracting 4 from them are as below. The value below 0 is fixed to 0.
STA 1 OBO=10−4=6
STA 2 OBO=3−4=−1 (→0)
STA 3 OBO=5−4=1
STA 4 OBO=4−4=0
STA 5 OBO=1−4=−3 (→0)
STA 6 OBO=8−4=4
STA 7 OBO=2−4=−2 (→0)
STA 8 OBO=10−4=6

Terminals 2, 4, 5 and 7 have the OBO count after the update reaching a predetermined value ( 0), and thus, terminals 2, 4, 5 and 7 acquire the selection right. Each of terminals 2, 4, 5 and 7 selects the resource unit randomly from RU #1 to RU #4 being STA-unspecified RUs which are specified in the trigger frame for random access 501. Here, assume that terminal 2 selects RU #4, terminals 4 and 7 select RU #3, and terminal 5 selects RU #1. Terminal 4 and terminal 7 select the same resource unit. Other terminals than terminals 2, 4, 5 and 7, which have the OBO count after the update larger than 0, cannot acquire the selection right, and wait for the next transmitted trigger frame for random access.

Terminals 2, 4, 5 and 7 use RU #4, RU #3, RU #1 and RU #3 to transmit frames 512, 514, 515 and 517, respectively, after elapse of a predetermined time period from completion of receiving the trigger frame for random access 501. Terminal 4 and terminal 7 transmit the frames by use of the same resource unit (see a shaded area in FIG. 15).

The base station performs the process to receive and decode frame 515 transmitted from terminal 5 by use of RU #1, frames 514 and 517 transmitted from terminals 4 and 7 by use of RU #3, and the frame 512 transmitted from terminal 2 by use of RU #4, and subjects the decoded frames to the FCS check (e.g., CRC check) to determine whether or not the frames are successfully received. Assume that frame 515 from terminal 5 transmitted via RU #1 and frame 512 from terminal 2 transmitted via RU #4 are successfully received, and frames 514 and 517 transmitted via RU #3 from terminals 4 and 7 are failed to be received.

The base station generates and transmits, depending on check results (success or failure of the reception) of the frames, a Multi-STA BA frame 507 as the acknowledgement response frame including an indication that frames 512 and 515 transmitted from terminals 2 and 5 are successfully received. Since frames 514 and 517 transmitted from terminals 4 and 7 are failed to be received, the acknowledgement with respect to each of terminals 4 and 7 is not included in the Multi-STA BA frame 507. Note that in a case where the aggregation frame including the plural data frames (i.e., MPDUs or sub-frames) is transmitted from each of terminals 4 and 7, if all of the aggregated data frames (i.e., MPDUs or sub-frames) are failed to be received, the acknowledgement with respect to each of terminals 4 and 7 may not be included in the Multi-STA BA frame 507. On the other hand, if a part of the aggregated data frames (i.e., MPDUs or sub-frames) are successfully received, the acknowledgement concerning the data frames a part of which is successfully received may be included through the Block Ack Starting Sequence Control subfield and the Block Ack Bitmap subfield.

Of the terminals receiving the Multi-STA BA frame 507, terminals 2, 4, 5 and 7 confirm whether or not the acknowledgement with respect to each of frames 512, 514, 515 and 517 transmitted from them is included in the Multi-STA BA frame 507. Terminals 2 and 5 detect that the acknowledgement for each of the frames 512 and 515 transmitted from them is included, but terminals 4 and 7 cannot confirm the acknowledgement for each of the frames 514 and 517 transmitted from them and determine that they failed in the transmission. Here, having failed in the transmission includes, not only a case (this case) where the base station cannot successfully receive frames transmitted from the plural terminals by use of the same resource unit, but also a case where the base station fails to receive a frame transmitted from a single terminal in a certain resource unit, which is caused by a bad radiowave environment. If the downlink response frame such as the Multi-STA BA frame is not received within a certain time period (SIFS time or the like) from the completion of transmitting frames 512, 514, 515 and 517, the failure in transmission may be determined. Note that if the terminal transmits the aggregation frame in which the plural data frames are aggregated and a part of the data frames are transmitted successfully, the terminal may determine the success in the transmission (random access), as an example, and if all the data frames are failed to be transmitted, the terminal may determine the failure in the transmission (random access).

The base station, after transmitting the Multi-STA BA frame 507, transmits the trigger frame for random access 503 at a predetermined timing or an arbitrary timing. The trigger frame for random access 503 has a structure similar to the trigger frame for random access 501, and specifies RU #1 to RU #4 as the STA-unspecified RU. Note that any transmission may be performed between after the transmission of the Multi-STA BA frame 507 and before the transmission of the trigger frame for random access 503. For example, the ordinary trigger frame (a trigger frame specifying a terminal for each resource unit) may be transmitted by the base station such that the terminals use respective specified resource unit to perform communication in uplink transmission (UL-OFDMA).

Terminals 1 to 8 hold the OBO count (backoff count) updated when the trigger frame for random access 501 was received last time. However, terminal 2, 4, 5 and 7 which performed the random access to the trigger frame for random access 501 again select the OBO count from the range from 0 to the CWO. However, terminals 2 and 5 succeeded in the transmission, and terminals 4 and 7 failed in the transmission. Therefore, the embodiment has a feature that the CWO is selected as below.

Terminals 4 and 7 having failed in the transmission select the CWO smaller than the last one (CWO=31) from a range between the CWOmin and the CWOmax. The CWO is gradually decreased until the CWOmin for every transmission failure. In the case of success in the transmission, the CWO is returned to the initial value CWOinit (e.g., 31).

As an example, assume that CWOmin=1 and CWOmax=31, and the initial value CWOinit is 31 as the CWOmax. Every time the transmission has failed, the CWO is gradually decreased from 31 to 1. Beginning from 31, a constant value may be cumulatively subtracted every transmission failure, or as the number of the failure increases, a larger value may be cumulatively subtracted. As an example of the latter, it may be that 1 is subtracted caused by the first failure, 2 is subtracted caused by the second failure, and 3 is subtracted caused by the third failure. In this case, if the CWO at the start is 31, the CWO after the first failure is 30 (=31−1), after the second failure, 28 (=30−2), and after the third failure, 25 (=28−3) . . . . The adjustment amount (changing amount) by which the CWO is to be adjusted (changed) may be notified from the base station to each terminal as information concerning the CWO. The method for notifying the adjustment amount may be same as or similar to other notification methods as described later.

As another method, an exponent part P may be used to define a calculation formula of the CWO as $2^P-1$, for example, and decrease the value of P every transmission failure. As an example, in the case of the CWOmax, if P=5, CWOmax=$2^5-1$=31. In the case of CWOmin=1, if P=1, CWOmin=$2^1-1$=1. Assume, at the beginning, the CWO coincides with the CWOmax. In this case, every transmission failure, the CWO is updated as below.

At the beginning 31 (=$2^5-1$)
<in failure>→15 (=$2^4-1$)
  <in failure>→7 (=$2^3-1$)
    <in failure>→3 (=$2^2-1$)
      <in failure>→1 (=$2^1-1$)

Figure 16:
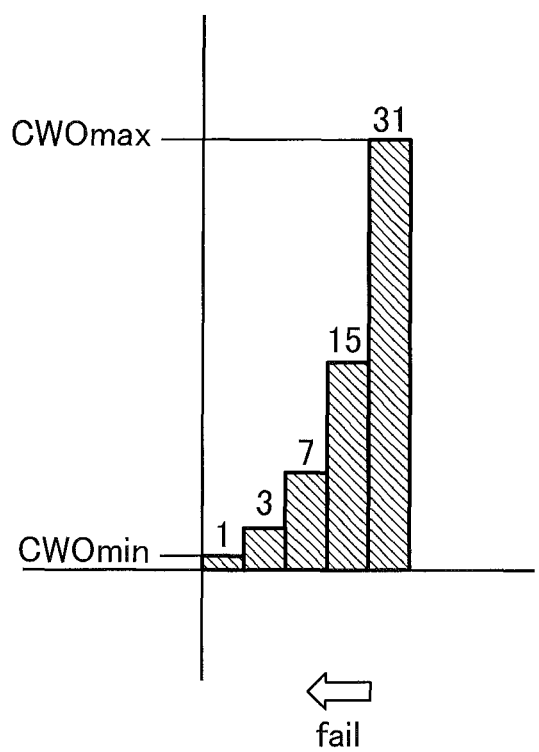
FIG. 16 is a diagram schematically showing a state of update of a CWO (Contention Window for UL-OFDMA)

This state is schematically shown in FIG. 16. In the case of the success in the transmission, the CWO is returned to CWOmax=31. The value of P may be notified from the base station to each terminal as information concerning the CWO. The method for notifying the value of P may be same as or similar to other notification methods as described later. The value of P is one example of the above adjustment amount.

In the case of the latter method, in this sequence, terminals 4 and 7 each has the CWO of 15 (=2^4 −1), for example, after the first transmission failure. Terminals 2 and 5, which have succeeded in the transmission, use the CWO that is still the initial CWOinit (=CWOmax) of 31 (=2^5−1). Terminals 4 and 7 select the OBO count (backoff count) from [0, 15] randomly, and assume that terminal 4 selects 7 and terminal 7 selects 4. Terminals 2 and 5 select the OBO count (backoff count) from [0, 31] randomly, and assume that terminal 2 selects 23 and terminal 5 selects 18. Other terminals than these use the OBO count currently held by them as it is.

Therefore, the OBO counts of terminals 1 to 8 (STAs 1 to 8) are as below (as a result, it happens that the OBO counts of the terminals are the same as in the case of the exemplary sequence in FIG. 7).

STA 1 OBO=6
STA 2 OBO=23
STA 3 OBO=1
STA 4 OBO=7
STA 5 OBO=18
STA 6 OBO=4
STA 7 OBO=4
STA 8 OBO=6

The number of STA-unspecified RUs is 4 in the trigger frame for random access 503, and thus, the OBO counts after the update obtained by subtracting 4 from the OBO counts of the terminals are as below. The value below 0is fixed to 0 (as a result, it happens that the OBO counts of the terminals are the same as in the case of the exemplary sequence in FIG. 7).

STA 1 OBO=6−4=2
STA 2 OBO=23−4=19
STA 3 OBO=1−4=−3 (→0)
STA 4 OBO=7−4=3
STA 5 OBO=18−4=14
STA 6 OBO=4−4=0
STA 7 OBO=4−4=0
STA 8 OBO=6−4=2

Terminals 3, 6, and 7 have the OBO count after the update reaching a predetermined value (0), and thus, terminals 3, 6, and 7 acquire the selection right. Terminals 3, 6, and 7 each selects the resource unit randomly from RU #1 to RU #4 being STA-unspecified RUs which are specified in the trigger frame for random access 503. Here, assume that terminal 3 selects RU #2, terminal 6 selects RU #4, and terminal 7 selects RU #1. Other terminals than terminals 3, 6, and 7, which have the OBO count after the update larger than 0, cannot acquire the selection right, and wait for the next transmitted trigger frame for random access.

Terminals 3, 6, and 7 use RU #2, RU #4, and RU #1 to transmit frames 523, 526, and 527, respectively, after elapse of a predetermined time period from completion of receiving the trigger frame for random access 503. Note that since RU #3 is not selected by any terminal, the transmission is not performed at RU #3. Note that the frames transmitted by terminals 3, 6, and 7 may be an aggregation frame (A-MPDU) including plural data frames (i.e., MPDUs or sub-frames) being aggregated.

The base station receives and decodes frames 527, 523, and 526 transmitted from terminals 7, 3, and 6 by use of RU #1, RU #2 and RU #4 and subjects the decoded frames to the FCS check (e.g., CRC check) to determine whether or not the frames are successfully received. The base station generates and transmits (downlink response) an acknowledgement response frame depending on check results (success or failure of the reception) of the frames. Similarly to the above description, here, Multi-STA BA frame 504 is transmitted as the single acknowledgement response frame which represents an acknowledgement for all the terminals 3, 6, and 7. The operation of the terminal having received Multi-STA BA frame 504 is the same as in the case of Multi-STA BA frame 502.

The value of at least one of CWOmax or CWOmin may be notified by means of the beacon frame, the trigger frame (including the trigger frame for random access) or the like from the base station to the terminals belonging to the BSS. In the case of notifying through the trigger frame, the common information field, the terminal information field or the other field may be provided with a field set to at least one of the CWOmax or CWOmin. The initial value of the CWO (CWOinit) may also be notified in the same way, or may be defined beforehand in the system or by the standard.

Differences between the update of the CWO value according to the embodiment and the update of the contention window (CW) used for a random backoff mechanism for the CSMA/CA is described. Assume a terminal performs the backoff (carrier sense) by way of the CSMA/CA during a time period based on the CW and performs transmission with the carrier sense being idle. At this time, if the transmission of the terminal is incidentally made simultaneously with transmission of another terminal, the terminal determines that the ACK is not responded due to the ACK Timeout and exponentially increases a CW value. An initial value of the CW value is CWmin, and the CW value is increased up to the CWmax as retransmission is performed. This is a measure for giving a further dispersion on a temporal axis in order to avoid the simultaneous transmission, on the basis of a determination that the CW value used against competing terminals does not give sufficient dispersion. In contrast to this, in the scheme of the trigger frame for random access according to the embodiment, there are two kinds of terminals that is one successful in acquiring the STA-unspecified RU and the other unsuccessful among the plural terminals acquiring the selection right at the same time (in the random backoff mechanism for the CSMA/CA, all terminals which perform transmission at the same time point basically fail in the transmission (the ACK is not responded)). This is significantly different from the random backoff mechanism on the temporal axis. In this case, giving, to the terminal which was successful in acquiring the STA-unspecified RU and the terminal which was unsuccessful, the same condition for acquiring STA-unspecified RU at the next trigger frame for random access may lack fairness. Therefore, in the embodiment, the CWO value of the terminal having failed in the acquisition is decreased every transmission failure to put a higher priority for the acquisition than on the terminal having succeeded in the acquisition, keeping the fairness between the terminals.

Figure 17:
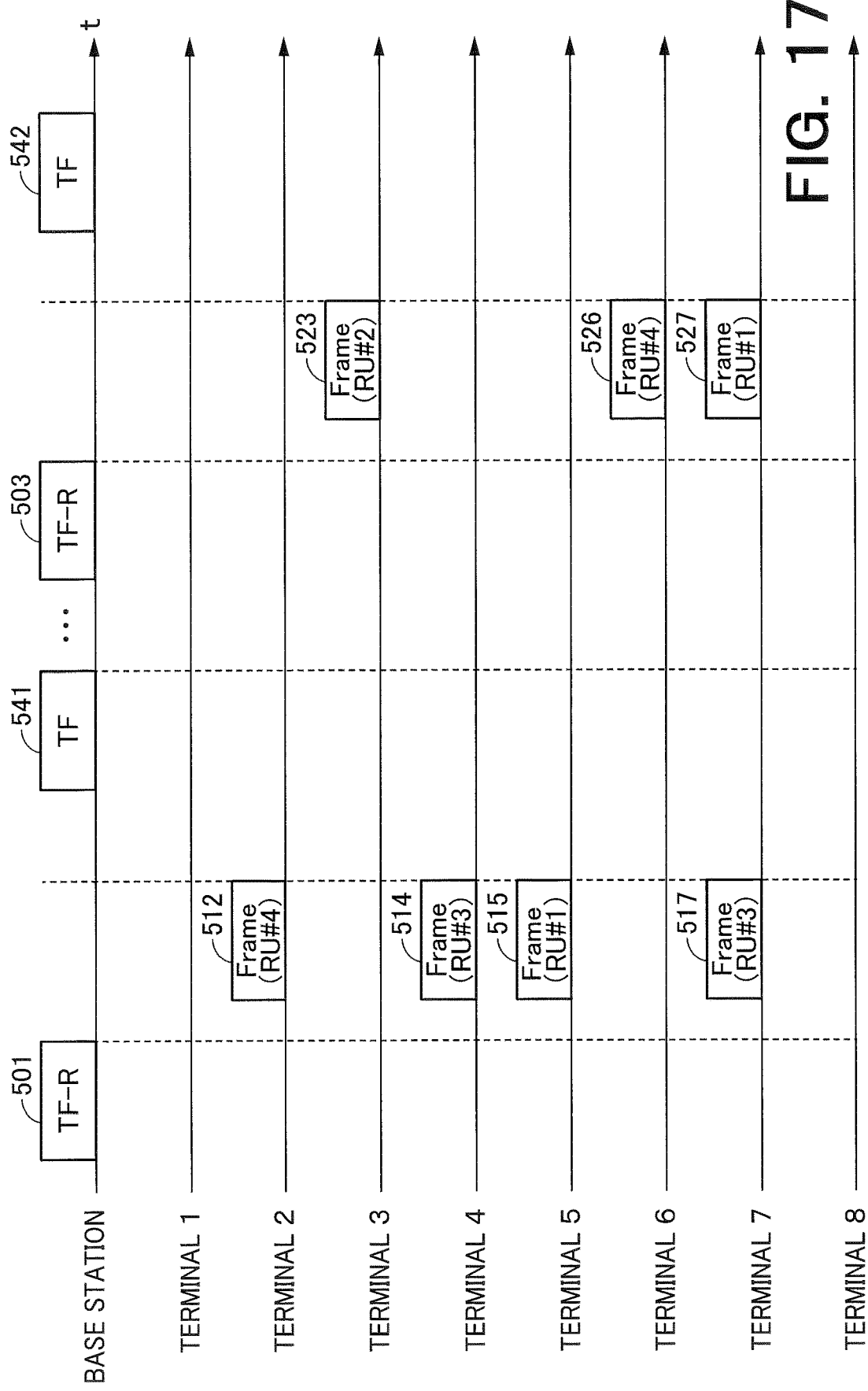
FIG. 17 is a diagram showing an exemplary operational sequence in a case of transmitting a trigger frame instead of an acknowledgement response frame.

In the embodiment described above, the acknowledgement response frame (Multi-STA BA frame) is transmitted as the downlink response to the plural terminals having succeeded in the transmission (random access), but an embodiment may be conceivable in which the ordinary trigger frame is transmitted instead of transmitting the acknowledgement response frame. An exemplary sequence in this case is shown in FIG. 17.

Multi-STA BA frames 507 and 504 in FIG. 14 are replaced with trigger frames 541 and 542. Trigger frames 541 and 542 in this case specify terminals assigned for each resource unit. A format of the trigger frame is basically that shown in FIG. 9, and the structure of the common information field or the terminal information field or the both of these may be different from that of the trigger frame for random access. The terminals specified in trigger frame 541 or 542 use the resource units allocated to their own terminals to transmit the frames (here, it is assumed that the frame is the data frame) by way of the uplink transmission after elapse of a predetermined time period from completion of receiving the trigger frame 541 or 542. Each of the frames to transmit may be an aggregation frame including plural data frames (MPDUs or sub-frames) being aggregated.

The base station, in a case of transmitting trigger frame 541 or 542, may specify the terminal(s) which succeeded in the transmission by the random access to trigger frame for random access 501 or 503. By doing so, the terminal having succeeded in the transmission can detect the success in the random access to trigger frame for random access 501 or 503 on the basis of its own terminal to be specified in trigger frame 541 or 542. Of the terminals having performed the random access, the terminal not specified in trigger frame 541 or 542 can determine that its own terminal failed in the transmission. The frame transmitted by the random access may be a frame requesting its own terminals to be specified (i.e., allocated a resource unit) in trigger frame 541 or 542. Note that trigger frame 541 or 542 may limit the terminals to those having not performed the random access and/or to those having failed in the transmission. Trigger frame 541 or 542 may further include, besides the information specifying the resource units and the terminals, information required for the transmission by the terminal (packet length, transmission power, MCS, or the like). Note that processing on the selection of the terminal specified in the trigger frame may be made by the MAC processor 10 (e.g., the MAC common processor 20, the reception processor 40, or the transmission processor 30), or the MAC/PHY manager 60.

(Modification Example 1 of CWO Update)

In the embodiment described above, the CWO value of the terminal is decreased each time the terminal fails in transmission, but in a modification example 1, in addition to the above, the CWO value is increased each time the transmission has succeeded wherein the initial value of the CWO (CWOinit) is defined between the CWOmin and the CWOmax. The value of the CWOinit may be notified by means of the beacon frame, the trigger frame or the like from the base station to the terminals.

Figure 18:
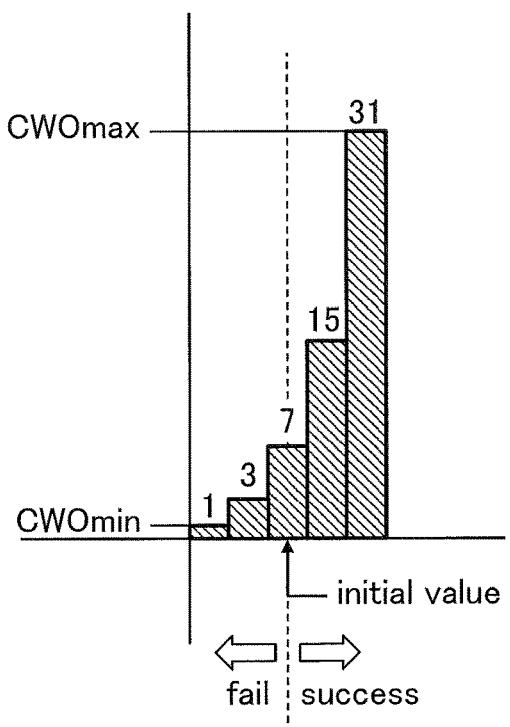
FIG. 18 is a diagram schematically showing an operation according to a modification example 1 of CWO update.

An operation according to the modification example 1 is schematically shown in FIG. 18. First, the value of the CWO is set to the CWOinit. In this example, it is 2^3−1=7, and this is an intermediate value between the CWOmin and the CWOmax (intermediate value of the exponent part). In case of success, a stage is raised by one (exponent part P is added by 1), and in the case of failure, the stage is returned by one (the exponent part P is subtracted by 1). A specific example is shown below.

At the Beginning 7

-<transmission success> -> 15
-<further transmission success> -> 31
-<transmission failure> -> 7
-<transmission failure> -> 3

(Modification Example 2 of CWO Update)

Figure 19:
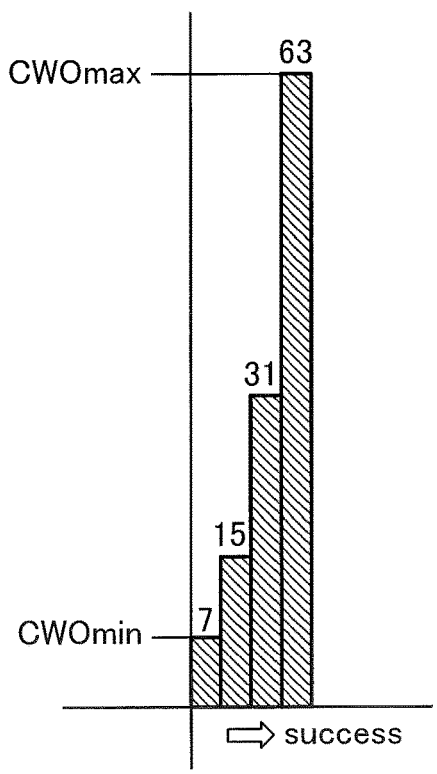
FIG. 19 is a diagram schematically showing an operation according to a modification example 2 of the CWO update.

The initial CWOinit is started from the CWOmin. In the case of transmission failure, the CWO is kept, and in the case of transmission success, the CWO is gradually increased up to the CWOmax for every transmission success. An operation according to a modification example 2 is schematically shown in FIG. 19.

First, the value of the CWO is set to the CWOmin (2^3−1=7 in this case). In the case of success, the stage is raised by one (exponent part P is added by 1) and in the case of failure, the CWO value is kept (the value of the exponent part P is kept). A concrete example is shown below.

At the Beginning 7

-<transmission success> -> 15
-<further transmission success> -> 31
-<transmission failure> -> 15
-<transmission failure> -> 7

This method is similar to the method of deciding the CW in the random backoff mechanism for the CSMA/CA, but different in the following point. In the modification example 2, the CWO value is increased every success, whereas in the random backoff mechanism for the CSMA/CA, the CW is increased every failure. Therefore, both are inverse in the operation of success and failure.

(Modification Example 3 of CWO Update)

A modification example 3 is used in combination with the above described embodiments and the first to second modification examples. In the modification example 3, when the same determination (success or failure) is made continuously N times, the CWO value is changed. Otherwise, the same CWO is kept. A value of N may be notified by means of the beacon frame, the trigger frame or the like from the base station to the terminals belonging to the BSS. As an example, N may be 2 or 3 or more.

For example, in a case where the modification example 3 is combined with the embodiment in which the CWO is decreased in the case of failure, the CWO value is decreased if the failure continuously occurred N times. If the continuous failure is interrupted (if the success is made) before it reaches N times, the CWO value is not changed. In a case of the combination with the embodiment in which the CWO is increased in the case of success, the CWO value is increased if the success continuously occurred N times. If the continuous success is interrupted (if the failure is made) before it reaches N times, the CWO value is not changed.

(Modification Example 4 of CWO Update)

As an operation of the base station, a time interval until the next trigger frame for random access (TF-R) is transmitted is notified as target transmission time, for example, by means of the beacon frame. The next trigger frame for random access subsequently further notifies whether or not the trigger frame for random access is transmitted. For example, a more data field in the Frame Control field is used as a Cascaded Indication bit, and the bit is set to 1 in a case of notifying that a subsequent trigger frame for random access exists (is scheduled). The bit is set to 0 in a case of notifying that a subsequent trigger frame for random access does not exist (is not scheduled). The Cascaded Indication bit may be provided in the common information field, the terminal information field, or a reserved field of MAC header in the trigger frame for random access.

Figure 20:
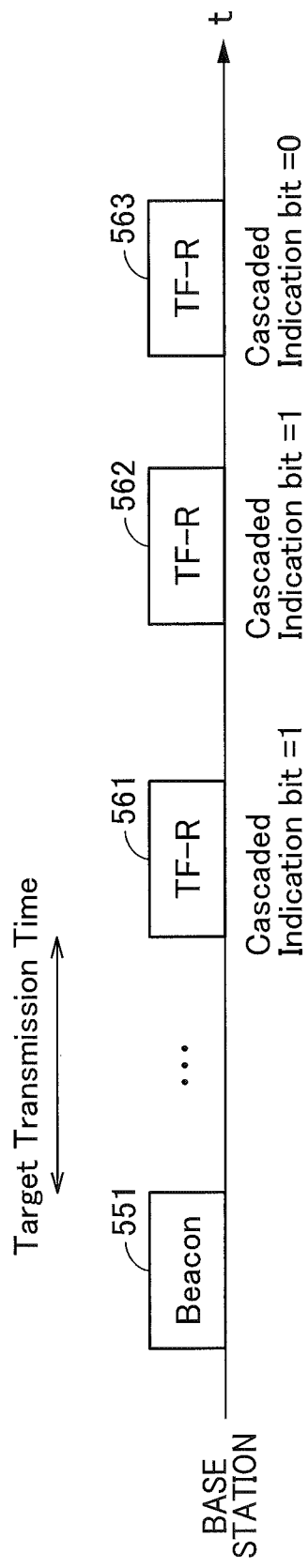
FIG. 20 a diagram showing an exemplary sequence of an operation of the base station according to a modification example 4 of the CWO update.

An exemplary sequence of the operation of the base station according to this modification example is shown in FIG. 20. Beacon frame 551 is used to notify a time interval until the next trigger frame for random access 561 as the target transmission time. For example, an information element for notifying the target transmission time may be newly defined. In trigger frame for random access 561, the Cascaded Indication bit is set to 1 because a subsequent trigger frame for random access 562 is scheduled to be transmitted. In trigger frame for random access 562, the Cascaded Indication bit is set to 1 because a subsequent trigger frame for random access 563 is scheduled. In trigger frame for random access 563, the Cascaded Indication bit is set to 0 because no subsequent trigger frame for random access is scheduled. Note that in FIG. 20 other frames transmitted by the base station (e.g., Multi-STA BA frame) are not shown.

In the sequence like this, if the trigger frame for random access is received with the Cascaded Indication bit being set to 1 (the next trigger frame for random access is subsequent), the terminal updates the CWO value in accordance with the above embodiments or modification examples as needed. If the trigger frame for random access is received with the Cascaded Indication bit being set to 0 (a time interval until the next trigger frame for random access is received is considered to be relatively long), the terminal resets the CWO value to be returned to the initial value (CWOinit). In this exemplary sequence, in a case where there is a terminal in a power saving mode, the terminal having received the beacon frame 551 may detect a time interval until the next trigger frame for random access 561 is transmitted to transit to the sleep mode for the time interval. In addition, the terminal, after receiving trigger frame for random access 563 with the Cascaded Indication bit being set to 0, may perform the random access to the trigger frame for random access 563 as needed, and thereafter, transit to the sleep mode. Note that this modification example is also applicable to the terminal which is not in the power saving mode. This modification example can be used in combination with the above described embodiments or other modification examples.

(Modification Example 5 of CWO Update)

In a case where the base station determines that many terminals fail in the transmission of the response (UL-OFDMA) to the trigger frame for random access, the base station may transmit an instruction to forcibly return the CWO value to the CWOmax or the CWOinit. For example, a bit (field) for notification may be defined in the trigger frame for random access and the instruction to return the CWO value to the CWOmax or the initial value (CWOinit) is given by means of the bit. The bit may be provided in the common information field or the terminal information field, or may be provided in a reserved field within the existing field. In the case where an instructed terminal, even if failing in the transmission, receives the next trigger frame for random access with the bit for notification being set to 1, the terminal returns the CWO to the CWOinit or the CWOmax (to which of the CWOinit or the CWOmax to return may be determined beforehand or a bit indicating which of the CWOinit or the CWOmax to select may be added). A timing for returning the CWO value to the CWOmax or the CWOinit may be a timing for updating the CWO value next time (timing at succeeding or failing in the transmission), or the CWO value may be immediately changed to re-obtain the backoff count (OBO count) using the changed CWO value. Note that as another example, an instruction to inhibit terminals from decreasing the CWO value may be also considered. Adjusting the CWO value as in this modification example can disperse the timings of the random access by the terminals. Note that it may be an instruction to return the CWO value to other value than the CWOmax and the CWOinit, for example, a middle value between the CWOmax and the CWOmin. The instruction to return the CWO value to the CWOmax, the CWOinit or the like may be applied to commonly both of the terminals having failed in the transmission and the terminals having succeeded or only to at least either side of the terminals. In the latter case, a notification field (i.e., a field for notification) for the terminals having failed in the transmission and a notification field for the terminals having succeeded in the transmission may be defined to set different instructions to change the CWO value respectively.

Here, the determination by the base station that many terminals fail in the transmission may be made in a case where the number of the failed terminals or the number of the resource units having failed in the transmission is equal to or more than a threshold. Alternatively, it may be made in a case where a ratio of the number of the resource units having failed in the reception to the number of STA-unspecified RUs which are specified in the trigger frame for random access (or the total number of the resource units having succeeded or failed in the reception) is equal to or more than a threshold, or other method may be used. This modification example can be used in combination with the above described embodiments or other modification examples.

(Modification Example 6 of CWO Update)

In a case where no downlink transmission response (the acknowledgement response frame such as the Multi-STA BA frame) is received from the base station after the terminal transmits the response to the trigger frame for random access (random access), the CWO may be returned to the CWOmax or the initial value (CWOinit). In such a case, since many terminals are possibly determined to fail in the transmission, changing the CWO value in this way can disperse the timings of the random access by the terminals. Note that the CWO value may be kept as it is, instead of returning the CWO value to the CWOmax or the initial value (CWOinit). This modification example can be used in combination with the above described embodiments or other modification examples.

Note that also in a case where although the ordinary trigger frame (see 541 and 542 in FIG. 17) is transmitted as the downlink response, only the terminal already specified in the trigger frame for random access (as described in the above, a terminal may be specified for a resource unit except the STA-unspecified RU in the trigger frame for random access) is specified in the ordinary trigger frame, the terminal may operate similarly to the case of with no downlink response from the base station. Additionally, in a case where the terminal specified in the trigger frame for random access does not exist or no uplink transmission is transmitted from the terminal specified in the trigger frame for random access, the ordinary trigger frame may not transmitted from the base station in some cases. In such a case also, the operation may be made similarly to the case of with no downlink response.

The terminal may operate as below. If the downlink response (e.g., Multi-STA BA frame) is transmitted from the base station, the number of the terminals having succeeded in the transmission by use of the STA-unspecified RU is counted. In the case of the terminal having failed in the transmission, its CWO value may be decreased, for example, if the number of the terminals having succeeded is equal to or more than a threshold or a ratio of the terminals having succeeded to the number of STA-unspecified RUs is equal to or more than a threshold. Alternatively, the downlink response frame transmitted from the base station may be provided with a notification bit instructing to decrease the CWO value, and the base station may instruct to decrease the CWO value by way of the bit. In this case, the terminal decreases the CWO value in accordance with the bit. The method of decreasing the CWO may conform to the above described embodiments or modification examples.

(Modification Example of Operation in Transmission Failure)

The terminal may keep the OBO count (OBO count before subtracting the number of STA-unspecified RUs) which was used in the failed transmission by use of the STA-unspecified RU, and use the kept OBO count for the next trigger frame for random access.

On the other hand, the base station may determine whether or not many terminals fail in the transmission of the response (UL-OFDMA) to the trigger frame for random access, and, if determining that many terminals fail, increase the number of STA-unspecified RUs in the next trigger frame for random access. This considers a probability that the terminal to newly acquire the selection right is additionally provided. Alternatively, the trigger frame for random access may be defined and transmitted which specifies only the terminals having failed in the transmission to be random-accessed. For example, a notification bit specifying only the terminals having failed in the transmission to be random-accessed may be provided in the common information field, the terminal information field, or the MAC header, and the trigger frame for random access with the notification bit being set is transmitted. The notification bit may be a reserved field within any field of the MAC header or may reuse one of the used fields for this purpose.

(Modification Example of Operation in Transmission Success)

The base station may put, with respect to the terminal having succeeded transmission in random access, a limitation on the number of times of waiting or waiting time period in view of allowing to respond (random-accessing) to the next and subsequent trigger frames for random access.

This information of the limitation may be notified together with the information on the terminal having succeeded in the reception (e.g., BA) by way of the notification field for the terminal having succeeded, in the downlink response by the base station after receiving the response (UL-OFDMA) to the trigger frame for random access. In a case where the downlink response has a BA format (in a case such as where the Multi-STA BA frame is used), the notification field may be structured using a reserved field within the frame of the BA format or reusing one of the used fields. If the trigger frame is used as the downlink response, the notification field may be provided in the common information field, the terminal information field, the MAC header or the like. Assume that, in this trigger frame, the above terminal having succeeded in the transmission is specified as a target to the UL-OFDMA.

If the terminal detects that it succeeded in the transmission on the basis of that there is an acknowledgement to the terminal or the terminal is specified in the downlink response frame, the terminal detects the limitation set on the number of times of waiting or the waiting time period from the notification field of the downlink response frame to operate so as to refrain from the transmission (random access) while the limitation is applied.

In a case where the limitation is on the number of times of waiting, the terminal decrements the number every time it receives a trigger frame for random access, and, from when receiving a trigger frame for random access after the number of times of waiting reaches 0, it starts the operation regarding the random access (e.g., the process of subtracting the number of STA-unspecified RUs from the OBO count). In a case where the limitation is on the waiting time period, the terminal stands by during the specified time period, and thereafter, from when receiving a trigger frame for random access, starts the operation regarding the random access.

While the above limitation is applied, the OBO count when the terminal succeeded in the transmission immediately before (OBO count before subtracting the number of STA-unspecified RUs) is kept, and, when receiving a trigger frame for random access after the limitation is released, the terminal subtracts the number of STA-unspecified RUs from the kept OBO count and when the OBO count reaches 0, it acquires the selection right and performs the random access. Note that the OBO count may not be necessarily kept, and a new OBO count may be re-obtained from the current CWO.

(Modification example of response method at base station) The base station measures a quality of reception from a terminal which succeeded in the transmission in response to the trigger frame for random access concerning the resource unit by use of which the transmission is performed. Examples of the reception quality include a reception RSSI (Received Signal Strength Indicator) or a reception EVM (Error Vector Magnitude), but not limited thereto. For example, an SN ratio (Signal to Noise Ratio; SNR) may be used. The base station determines whether or not a measured value is equal to or more or less than a threshold depending on a used index to determine whether or not the reception quality satisfies a criterion required for the response (is good or bad).

The base station determines, for a terminal bad in the reception quality, that the radiowave environment of the terminal by use of the resource unit is bad, and does not perform the downlink response (that is, does not include the acknowledgement for the terminal in the Multi-STA BA frame, or does not specify the terminal in the trigger frame (see FIG. 17), and so on). This makes the terminal to determine that the transmission (random access) failed. Note that the base station may perform the downlink response even to the terminal bad in the reception quality with the downlink response frame having added thereto information identifying the reception quality at this time. The terminal, in the case of determining that the reception quality at the base station is bad on the basis of the downlink response frame although it succeeded in the transmission, may select another resource unit next time. The base station may notify the information identifying the reception quality using a reserved field within the frame of the BA format or may reuse one of the used fields in the frame for this purpose.

Here, the terminal may selectively notify to the base station whether the terminal wants that the base station responds regardless of the reception quality in the case where the base station succeeded in the reception or the terminal wants that the base station does not respond if the reception quality is bad. The MAC header or the like of the frame transmitted from the terminal may be provided with a request bit (request field) which may be set to 1 in the case of wanting the base station not to respond if the reception quality is bad and may be set to 0 in the case of wanting the base station to respond regardless of the reception quality. A relationship between 1 and 0 of the bit may be inverted. The base station may switch the response operation in the case of having succeeded in the reception depending on the request bit included in the frame.

(Modification Example of Specifying Range of Random Number and Selecting STA-Unspecified RU)

In the above described embodiments and modification examples, the terminal, which acquires the selection right when the OBO count is below 0 as a result of subtracting the number of STA-unspecified RUs from the OBO count, selects any resource unit from among STA-unspecified RUs. For example, the resource unit is selected randomly. In this modification example, the resource unit to be selected is decided depending on the OBO count at a time of waiting for the trigger frame for random access. For example, when the trigger frame for random access is received in a state where the OBO count is 3, and if the number of STA-unspecified RUs is 4, the OBO count becomes 3−4=−1 (→0) and the terminal acquires the selection right. In this case, because the OBO count while waiting is 3, the resource unit corresponding to 3 (e.g., RU #3) is selected. The value of the OBO may be associated with the resource unit beforehand. One value may be associated with the plural resource units. In this case, a resource unit may be selected from the associated plural resource units randomly.

As another example, every time the trigger frame for random access is received, the CWO is set which is M times (M is an integer larger than 0) the number of STA-unspecified RUs. In other words, the CWO is set depending on the number of STA-unspecified RUs. For example, if the number of STA-unspecified RUs is 4 and M is 2, it is CWO=8. Then, a random number (OBO count) is selected from a range between 0 and (CWO−1). If the selected random number has a value equal to or less than a value obtained by subtracting 1 from the number of STA-unspecified RUs (i.e., "number of STA-unspecified RUs−1 "), the selection right is acquired and the resource unit is selected from STA-unspecified RUs. The "number of STA-unspecified RUs−1 " is an example, and the number of STA-unspecified RUs or another value may be used. The resource unit may be selected in accordance with an association in which the OBO count is associated with the resource unit beforehand. However, the selection may be made randomly. After the terminal transmits based on the selected resource unit, the terminal may adjust the M value from the initial value depending on whether the transmission has succeeded or not. The M value may be adjusted in a range between a minimum value and a maximum value which may be defined respectively. The adjustment method of the M value may be similar to the way of changing the CWO in the above described embodiments and modification examples. Decreasing the CWO corresponds to decreasing the M value and increasing the CWO corresponds to increasing the M value. Note that the setting of the CWO depending on the number of STA-unspecified RUs described in this paragraph may be applied to other modification examples.

The M value (at least one of initial value, minimum value, or maximum value) may be notified by means of the beacon frame, the trigger frame (including the trigger frame for random access) or the like to the terminals. An information element notifying the M value may be set in the beacon frame, or a reserved field within any field of the beacon frame may be used to set the M value. The common information field or the terminal information field of the trigger frame may be provided with a field notifying the M value, or a reserved field in the MAC header may be used or one of the used fields in the MAC header may be reused to notify the M value.

(Other Modification Examples)

In the above described embodiments and modification examples, the terminal having failed in transmission autonomously makes the determination to adjust the CWO value, but the base station may instruct the terminal to adjust the CWO value. As an example, in the trigger frame (see 541 and 542 in FIG. 14), in addition to the information specifying the terminal for each resource unit, information concerning the adjustment method of the CWO is set in at least one of the notification field for the terminal having failed in the transmission or the notification field for the terminal having succeeded in the transmission. In the adjustment method, the instructions are set such as to decrease the CWO, increase the CWO, return the CWO to the initial value, set the CWO to the maximum value, or set the CWO to the minimum value. When the instruction is to decrease or increase the CWO, the adjustment method may be decided similar to the way of operation at the terminal described above. The notification field may be provided in the common information field or the terminal information field of the trigger frame or both of them. Alternatively, a reserved field within any field of the MAC header or the like may be used or one of the used fields in the MAC header may be reused to form the notification field. For example, if the terminal detects that its own terminal is not specified in the trigger frame (see 541 and 542 in FIG. 14), the terminal updates the CWO value in accordance with the adjustment method specified in the notification field for the terminal having failed.

Figure 21:
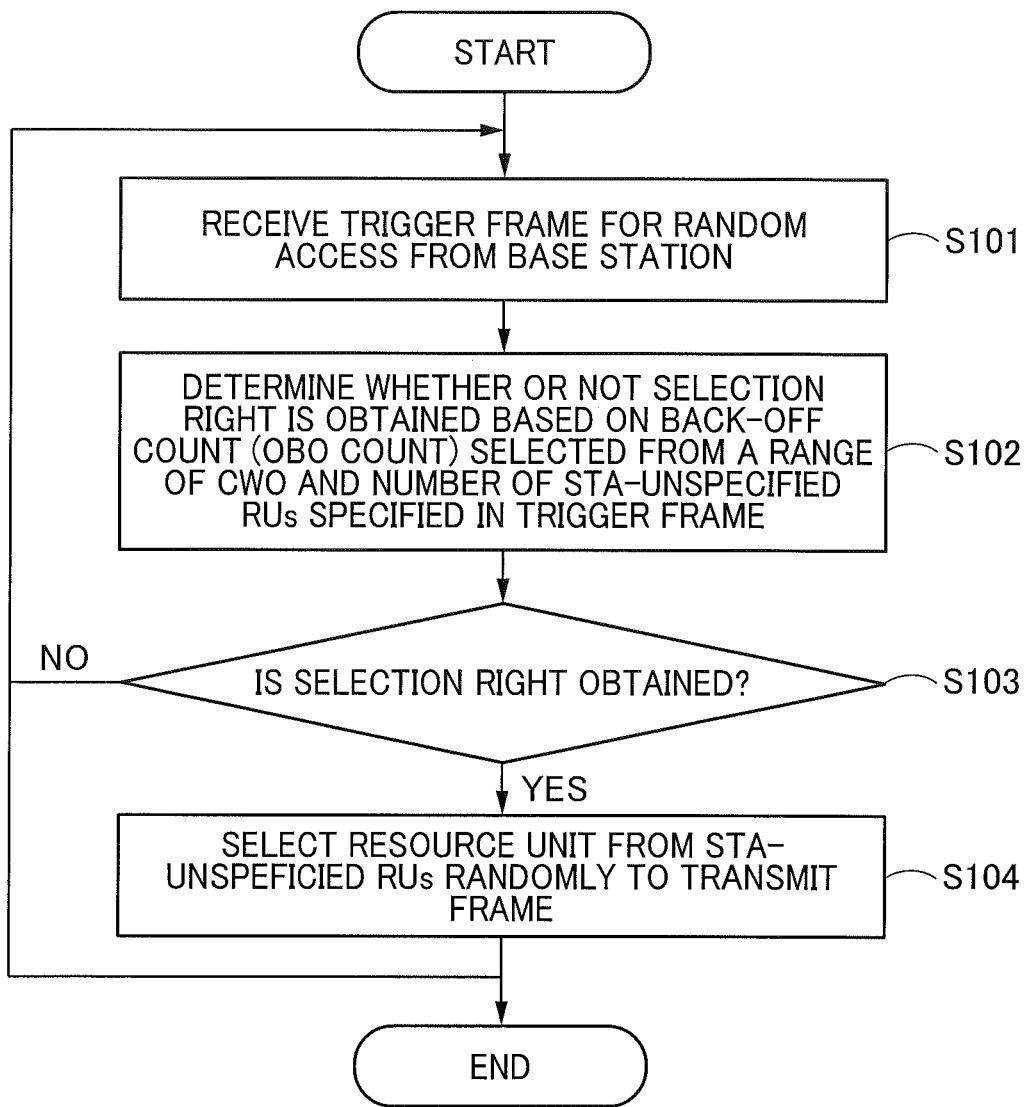
FIG. 21 is a diagram showing an exemplary flowchart of an operation of the terminal according to the embodiment of the invention operation.

FIG. 21 is a diagram showing an exemplary flowchart of the operation of the terminal according to the embodiment of the invention. The terminal receives from the base station a trigger frame (trigger frame for random access) specifying plural STA-unspecified RUs (resource unit for random access) (S101). The frame may specify that a part of the resource units except the STA-unspecified RUs are used by specific terminals. The terminal subtracts the number of STA-unspecified RUs which is specified in the trigger frame for random access from the backoff count (OBO count) selected from a range not more than the CWO value, and checks whether or not a value after the subtraction reaches a predetermined value (e.g., 0 ) (S102). If reaching a predetermined value, the terminal determines that the selection right to the STA-unspecified RU is acquired (YES), and if not reaching a predetermined value, the terminal determines that the selection right is not acquired (NO). Note that the subtraction may not be necessarily performed in fact, and as described above, for example, it may be determined whether or not the selection right is acquired on the basis of a magnitude relationship between the OBO count when the trigger frame for random access is received and the number of STA-unspecified RUs. The terminal, if acquiring the selection right, uses an arbitrary resource unit selected from STA-unspecified RUs to transmit the frame (S104). The type of frame transmitted may be arbitrary or may be a kind defined beforehand (for example, the transmitted frame may be a frame notifying a presence or absence of the uplink transmission request, and so on). The operation described here is merely an example, and various operations may be made depending on the above described embodiments and modification examples.

Figure 22:
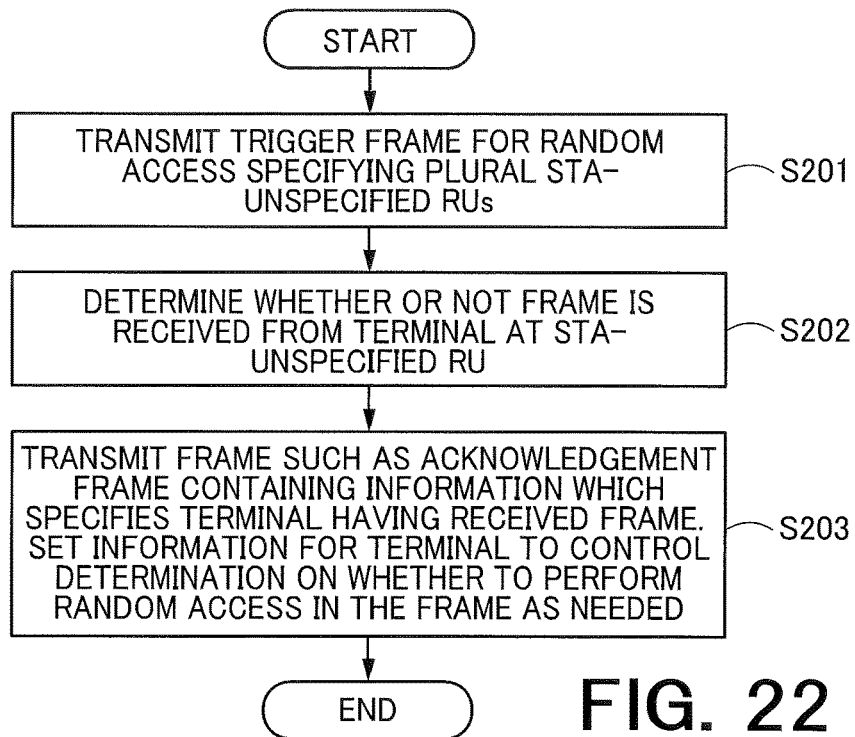
FIG. 22 is a diagram showing an exemplary flowchart of the operation of the base station according to the embodiment of the invention.

FIG. 22 is a diagram showing an exemplary flowchart of the operation of the base station according to the embodiment of the invention.

The base station transmits a trigger frame (trigger frame for random access) specifying plural STA-unspecified RUs (resource unit for random access) (S201). The frame may specify that a part of the resource units except the STA-unspecified RUs are used by specific terminals. The base station determines whether or not the response frames to the trigger frame for random access are received by use of the STA-unspecified RUs which are specified in the trigger frame for random access within a predetermined time period from the transmission (S202). More specifically, the base station decodes the wireless signals received by use of STA-unspecified RUs to check whether or not frames are successfully received. The base station transmits a frame including the information on the terminals from which the frames were successfully received in downlink (S203). The frame may be a Multi-STA BA frame or may be a trigger frame in which the terminals are assigned for the resource units to be used, as described above. In the latter case of the trigger frame, the terminals from which reception are succeeded is specified in the trigger frame. The downlink-transmitted frames may include information on a value range (CWO value) for the terminal to control determination on whether to respond (whether to perform the random access) to the trigger frame for random access. As an example, the number of terminals having succeeded in the transmission (the number of resource units by use of which the frames are successfully received) may be detected, and the downlink-transmitted frames may include information concerning the CWO value which is determined depending on the number of terminals (or the number of resource units). The examples of the information concerning the CWO value include instruction information to set the CWO value to an initial value, a minimum value, or an maximum value. The information concerning the CWO value may be set in notification fields respectively for the terminals having succeeded and the terminals having failed in transmission. Alternatively, a notification field for either one side of the terminals having succeeded and the terminals having failed may be defined to be set therein. Besides, the downlink-transmitted frames may include the information described in the above modification examples.

As described above, according to the embodiment of the present invention, the CWOs of the terminals are individually adjusted depending on the failure or success in the transmission responding to the trigger frame for random access, giving an opportunity of fair transmission (random access) between the terminals.

The embodiment describes the random access in the case of carrying out the UL-OFDMA to the trigger frame for random access, but may be applicable to the random access also in a case of another communication scheme combining the UL-OFDMA and the uplink MU-MIMO (UL-MU-MIMO) (UL-OFDMA & UL-MU-MIMO).

In the UL-MU-MIMO, the plural terminals simultaneously transmit the frames at the same frequency band to the base station (spatial multiplexing transmission) to give high-efficiency of the uplink transmission. Preamble signals orthogonal to each other are included in the physical headers of the frames transmitted from the plural terminals such that the base station can estimate an uplink channel response with each of the terminals on the basis of these preamble signals and separate these frames. In the UL-OFDMA & MU-MIMO, the plural terminals uses, for each of the resource units, the same resource unit to perform the MU-MIMO transmission. At this time, the plural terminals using the same resource unit use the preamble signals different from each other to perform the transmission. The embodiments are also applicable to the scheme like this.

Second Embodiment

Figure 23:
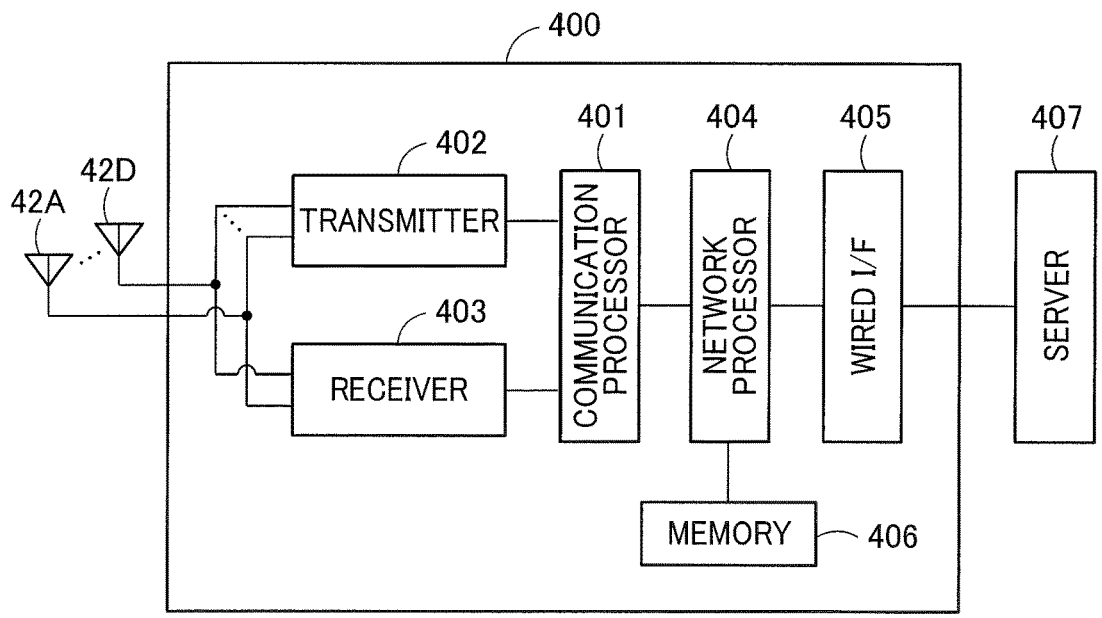
FIG. 23 is a functional block diagram of a base station or a terminal in accordance with a second embodiment.

FIG. 23 is a functional block diagram of a base station (access point) 400 according to a second embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to the MAC processor 10 and the MAC/PHY manager 60 described in the first embodiment. The transmitter 402 and the receiver 403 have functions similar to the PHY processor 50 and the analog processor 70 described in the first embodiment. The network processor 404 has functions similar to the higher processor 90 described in the first embodiment. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly. In this case, a wireless I/F may be employed instead of the wired I/F 405.

The server 407 is a communication apparatus that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication apparatus operated by the user, such as a PC or a smartphone.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) of the present embodiment can be applied as the base station of the first embodiment. In this case, the transmission of the frame, the data or the packet used in the first embodiment may be carried out based on the cached data stored in the memory 406. Also, information obtained based on the frame, the data or the packet received by the base station in the first embodiment may be cached in the memory 406. The frame transmitted by the base station in the first embodiment may include the cached data or information based on the cached data. The information based on the cached data may include information on existence or non-existence of data addressed to the terminal, information on a size of the data, or information on a size of a packet required for transmission of the data. The information based on the cached data may include a modulation scheme required for transmission of the data etc.

In the present embodiment, although the base station with the cache function is described, a terminal (STA) with the cache function can also be realized by the same block configuration as FIG. 23. Here, the terminal is non-AP terminal (as previously described, a base station (access point) is one mode of a wireless communication terminal). In this case, the wired I/F 405 may be omitted. The frame transmitted by the terminal in the first embodiment may include the cached data or information based on the cached data. The information based on the cached data may include information on existence or non-existence of data for transmission to the terminal, information on a size of the data, or information on a size of a packet required for transmission of the data. The information based on the cached data may include a modulation scheme required for transmission of the data etc.

Third Embodiment

Figure 24:
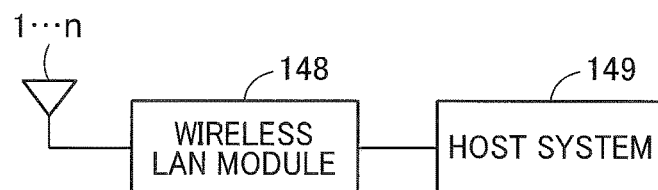
FIG. 24 is a diagram showing an exemplary entire configuration of the terminal or base station.

FIG. 24 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication apparatus according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 25:
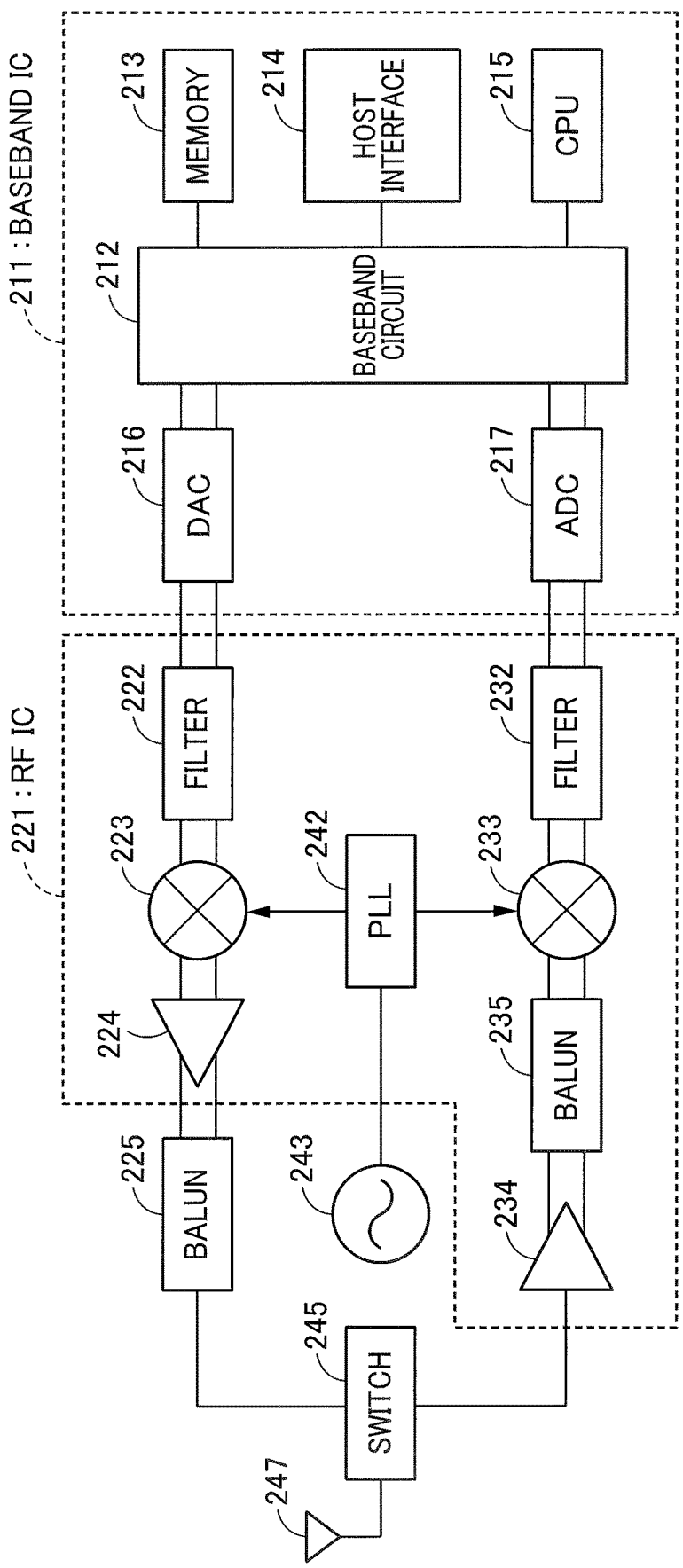
FIG. 25 is a diagram showing an exemplary hardware configuration of the wireless communication device installed at the terminal or base station.

FIG. 25 shows an example of hardware configuration of a wireless LAN module. The configuration can also be applied when the wireless communication apparatus is mounted on either one of the terminal that is a non-base station and the base station. Therefore, the configuration can be applied as an example of specific configuration of the wireless communication apparatus shown in FIG. 1. At least one antenna 247 is included in the example of configuration. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication apparatus) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The baseband circuit 212 or the CPU 215 may execute a process regarding the MIMO. The baseband circuit 212 or the CPU 215 may execute at least one or a plurality of a process of propagation path estimation, a transmission weight calculation process, a separation process of stream, and the like. The baseband circuit 212 or the CPU 215 may control the operation of the filters 222 and 232 to extract signals covered by a used channel according to the setting of the channel. Another controller that controls the filters 222 and 232 may exist, and the baseband circuit 212 or the CPU 215 may issue an instruction to the controller to perform similar control.

Fourth Embodiment

Figure 26:
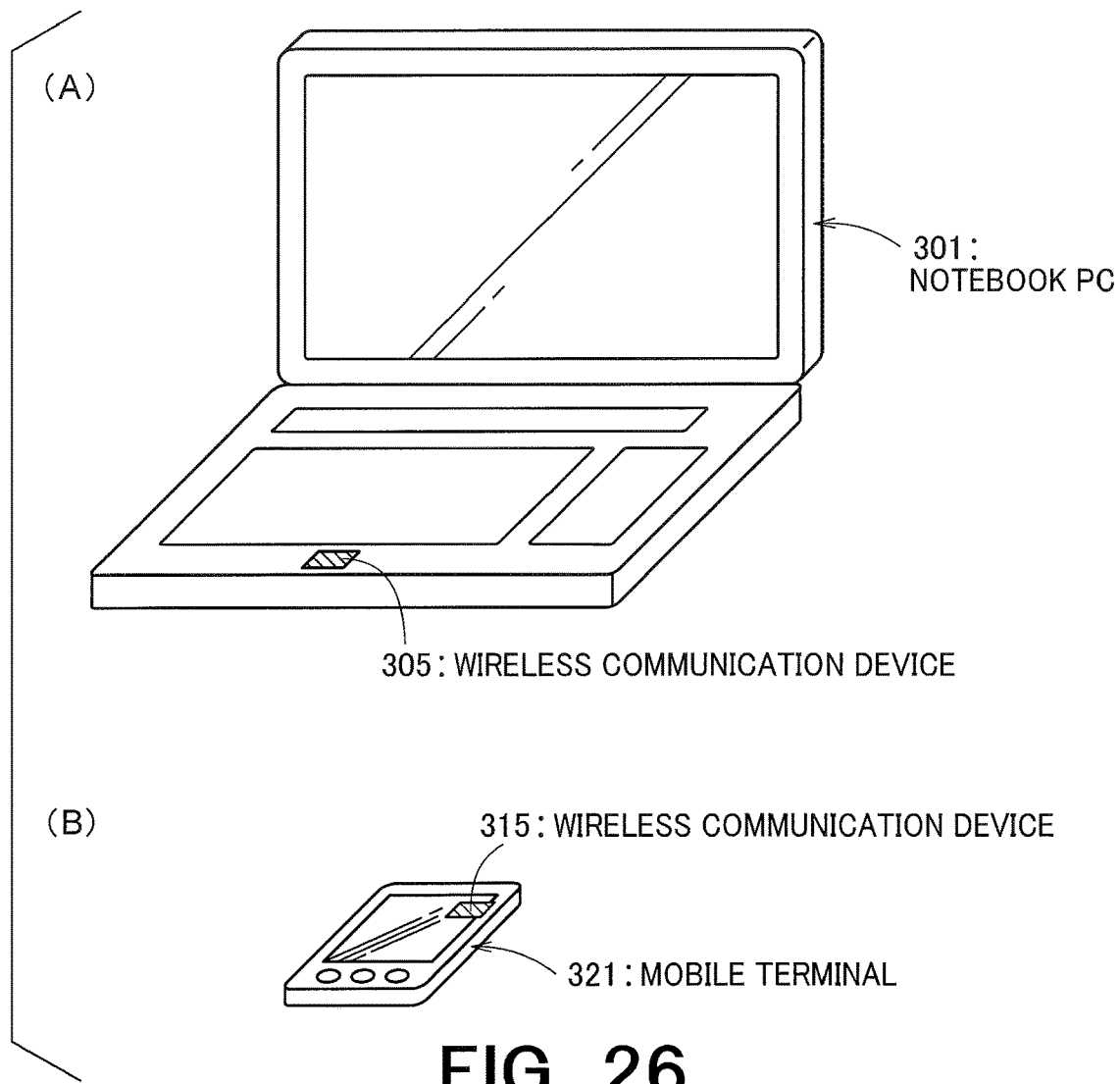
FIG. 26 is a perspective view of the wireless communication terminal according to the embodiment of the invention.

FIG. 26(A) and FIG. 26(B) are perspective views of wireless terminal according to the fourth embodiment. The wireless terminal in FIG. 26(A) is a notebook PC 301 and the wireless communication device (or a wireless device) in FIG. 26(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 27:
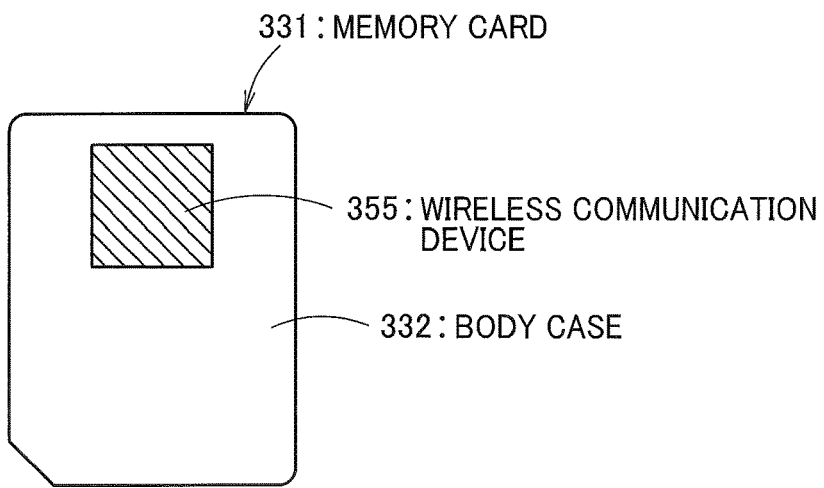
FIG. 27 a diagram showing a memory card according to the embodiment of the invention.

Moreover, a wireless communication device installed in a terminal (which may indicate a base station) can also be provided in a memory card. FIG. 27 illustrates an example of a wireless communication device mounted on a memory card. A memory card 331 contains a wireless communication device 355 and a body case 332. The memory card 331 uses the wireless communication device 355 for wireless communication with external devices. Here, in FIG. 27, the description of other installed elements (for example, a memory, and so on) in the memory card 331 is omitted.

Fifth Embodiment

In the fifth embodiment, a bus, a processor unit and an external interface unit are provided in addition to the configuration of the wireless communication device (which may indicate the wireless communication device mounted in the terminal, the wireless communication device mounted in the base station or both of them) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Sixth Embodiment

In the sixth embodiment, a clock generating unit is provided in addition to the configuration of the wireless communication device (which may indicate the wireless communication device mounted in the terminal, the wireless communication device mounted in the base station or both of them) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Seventh Embodiment

In the seventh embodiment, a power source unit, a power source controlling unit and a wireless power feeding unit are included in addition to the configuration of the wireless communication device (which may indicate the wireless communication device mounted in the terminal, the wireless communication device mounted in the base station or both of them) according to any of the above embodiments. The power supply controlling unit is connected to the power source unit and to the wireless power feeding unit, and

Eighth Embodiment

In the eighth embodiment, a SIM card is added to the configuration of the wireless communication device (which may indicate the wireless communication device mounted in the terminal, the wireless communication device mounted in the base station or both of them) according to the above embodiments. For example, the SIM card is connected with the MAC processing unit 10, the MAC/PHY management unit 60 or the controlling unit 112 in the wireless communication device. Thus, by adopting a configuration in which the SIM card is included in the wireless communication device, authentication processing can be easily performed.

Ninth Embodiment

In the ninth embodiment, a video image compressing/decompressing unit is added to the configuration of the wireless communication device (which may indicate the wireless communication device mounted in the terminal, the wireless communication device mounted in the base station or both of them) according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Tenth Embodiment

In the tenth embodiment, an LED unit is added to the configuration of the wireless communication device (which may indicate the wireless communication device mounted in the terminal, the wireless communication device mounted in the base station or both of them) according to any of the above embodiments. For example, the LED unit is connected to at least one of the MAC processing unit 10, the MAC/PHY management unit 60, the transmission processing circuit 113, the reception processing circuit 114 or the controlling circuit 112. Thus, by adopting a configuration in which the LED unit is included in the wireless communication device, notifying the operation state of the wireless communication device to the user can be easily done.

Eleventh Embodiment

In the eleventh embodiment, a vibrator unit is included in addition to the configuration of the wireless communication device (which may indicate the wireless communication device mounted in the terminal, the wireless communication device mounted in the base station or both of them) according to any of the above embodiments. For example, the vibrator unit is connected to at least one of the MAC processing unit 10, the MAC/PHY management unit 60, the transmission processing circuit 113, the reception processing circuit 114 or the controlling circuit 112. Thus, by adopting a configuration in which the vibrator unit is included in the wireless communication device, notifying the operation state of the wireless communication device to the user can be easily done.

performs control to select a power source to be supplied to the wireless communication device. Thus, by adopting a configuration in which the power source is included in the wireless communication device, power consumption reduction operations that control the power source are possible.

Twelfth Embodiment

In a twelfth embodiment, the configuration of the wireless communication device includes a display in addition to the configuration of the wireless communication device (which may indicate the wireless communication device mounted in the terminal, the wireless communication device mounted in the base station or both of them) according to any one of the above embodiments. The display may be connected to the MAC processing unit of the wireless communication device via a bus (not shown). As seen from the above, the configuration including the display to display the operation state of the wireless communication device on the display allows the operation status of the wireless communication device to be easily notified to a user.

Thirteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection, there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of IEEE802.11 wireless LAN is described. There are several types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 28:
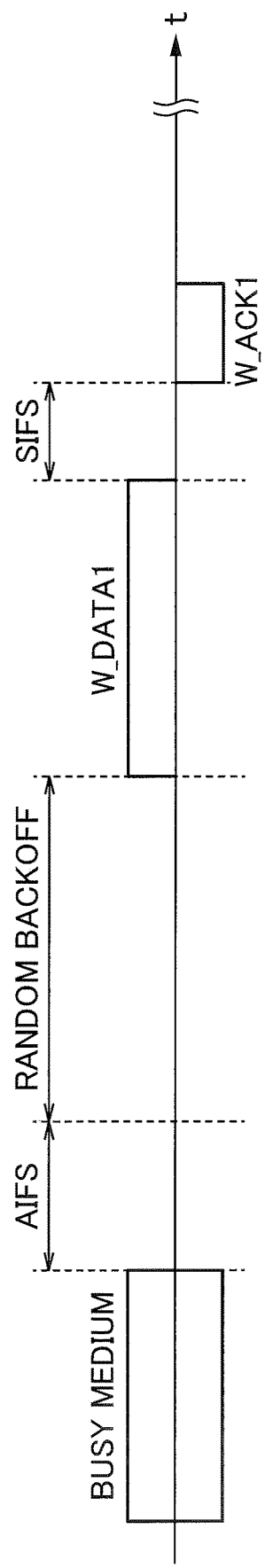
FIG. 28 is a diagram showing an example of frame exchange during a contention period.

Here, FIG. 28 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 µs and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO (AC_VI) and VOICE (AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

When it is expressed that the plurality of terminals transmits/receives a plurality of frames or a plurality of X-th frames, the frames or the X-th frames may be the same (for example, the same type or the same content) or may be different. An arbitrary value can be put into X according to the situation.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The term "circuitry" may refer to not only electric circuits or a system of circuits used in a device but also a single electric circuit or a part of the single electric circuit. Moreover, the term "circuitry" may refer one or more electric circuits disposed on a single chip, or may refer one or more electric circuits disposed on a plurality of chips more than one chip or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A wireless communication device comprising:
   a transmitter configured to transmit a first frame including information to specify a plurality of random access resource units wherein the first frame is a trigger frame;
   a receiver configured to receive one or more second frames via at least one of the plurality of random access resource units; and
   controlling circuitry configured to manage a minimum value and a maximum value used in transmission of the one or more second frames, wherein
   the transmitter is configured to transmit a third frame including the minimum value and the maximum value,
   the minimum value and the maximum value are used in a wireless communication terminal, which receives the first frame and determines whether to transmit the second frame via one of the plurality of random access resource units, to restrict a minimum range and a maximum range of a first value range for updating the first value range,
   the first value range is used to determine a first value which is used to determine whether to transmit in one of the one or more random access resource units in the wireless communication terminal,
   the first value is randomly selected from the first value range, and
   wherein the first value range is updated based on a result status of success or failure of transmitting the one of the one or more second frames in the wireless communication terminal.

2. The wireless communication device according to claim 1, wherein the third frame is a beacon frame or a probe response frame.

3. The wireless communication device according to claim 1, further comprising at least one antenna.

4. A wireless communication method comprising:
   transmitting a first frame including information to specify a plurality of random access resource units wherein the first frame is a trigger frame;
   receiving one or more second frames via at least one of the plurality of random access resource units; and
   managing a minimum value and a maximum value used in transmission of the one or more second frames,
   transmitting a third frame including the minimum value and the maximum value, wherein
   the minimum value and the maximum value are used in a wireless communication terminal, which receives the first frame and determines whether to transmit the second frame via one of the plurality of random access resource units, to restrict a minimum range and a maximum range of a first value range for updating the first value range,
   the first value range is used to determine a first value which is used to determine whether to transmit in one of the one or more random access resource units in the wireless communication terminal,
   the first value is randomly selected from the first value range, and
   wherein the first value range is updated based on a result status of success or failure of transmitting the one of the one or more second frames in the wireless communication terminal.

* * * * *